United States Patent
Zubrin et al.

(10) Patent No.: US 9,605,523 B2
(45) Date of Patent: *Mar. 28, 2017

(54) SYSTEMS AND METHODS FOR GENERATING IN-SITU CARBON DIOXIDE DRIVER GAS FOR USE IN ENHANCED OIL RECOVERY

(71) Applicant: Pioneer Energy, Inc., Lakewood, CO (US)

(72) Inventors: Robert M. Zubrin, Golden, CO (US); Mark H. Berggren, Golden, CO (US)

(73) Assignee: Pioneer Energy, Inc., Lakewood, CO (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/143,754

(22) Filed: Dec. 30, 2013

(65) Prior Publication Data

US 2014/0284066 A1  Sep. 25, 2014

Related U.S. Application Data

(63) Continuation of application No. 12/868,015, filed on Aug. 25, 2010, now Pat. No. 8,616,294, which is a
(Continued)

(51) Int. Cl.
*E21B 43/16* (2006.01)

(52) U.S. Cl.
CPC .......... *E21B 43/164* (2013.01); *E21B 43/168* (2013.01); *Y02C 10/14* (2013.01); *Y02P 90/70* (2015.11)

(58) Field of Classification Search
CPC ...... E21B 43/164; E21B 43/168; Y02P 90/70; Y02C 10/14
See application file for complete search history.

(56) References Cited

U.S. PATENT DOCUMENTS

| 494,647 A | 4/1893 | Preston |
|---|---|---|
| 2,595,979 A | 5/1952 | Pevere et al. |

(Continued)

FOREIGN PATENT DOCUMENTS

| CA | 2647825 C | 10/2007 |
|---|---|---|
| CA | 2739274 C | 4/2012 |

(Continued)

OTHER PUBLICATIONS

"Economies of Scale" Encyclopedia of Business, 2nd ed. Available Website: http://www.referenceforbusiness.com/encyclopedia/Eco-Ent/Economies-of-Scale.html Accessed on May 25, 2010.
(Continued)

*Primary Examiner* — Brad Harcourt
(74) *Attorney, Agent, or Firm* — Brownstein Hyatt Farber schreck, LLP; Paul J. Prendergast; Cara L. Crowley-Weber

(57) ABSTRACT

The present invention is an in-situ apparatus for generating carbon dioxide gas at an oil site for use in enhanced oil recovery (EOR). The apparatus includes a steam generator adapted to boil and superheat water to generate a source of superheated steam, as well as a source of essentially pure oxygen. The apparatus also includes a steam reformer adapted to react a carbonaceous material with the superheated steam and the pure oxygen, in an absence of air, to generate a driver gas comprising primarily carbon dioxide gas and hydrogen gas. A separator is adapted to separate at least a portion of the carbon dioxide gas from the rest of the driver gas to generate a carbon dioxide-rich driver gas and a hydrogen-rich fuel gas. A compressor is used for compressing the carbon dioxide-rich driver gas for use in enhanced oil recovery, and the compressed carbon dioxide-rich driver gas, with substantially no oxygen, is injected to a predetermined depth in order to enhance oil recovery at the
(Continued)

oil site. Unlike traditional $CO_2$-EOR, which requires large power plants stationed near metropolitan areas and expensive pipeline networks, the in-situ apparatus can be placed or constructed at the site of the oil field, while a portion of the carbonaceous material may be obtained from a site outside the oil field.

15 Claims, 16 Drawing Sheets

Related U.S. Application Data continuation-in-part of application No. 12/165,585, filed on Jun. 30, 2008, now Pat. No. 7,810,565, which is a continuation of application No. 11/751,028, filed on May 20, 2007, now Pat. No. 7,650,939.

(56) References Cited

U.S. PATENT DOCUMENTS

| | | | |
|---|---|---|---|
| 2,623,596 A | 12/1952 | Whorton et al. |
| 3,051,235 A | 8/1962 | Banks |
| 3,084,919 A | 4/1963 | Slater |
| 3,193,006 A | 7/1965 | Lewis |
| 3,244,231 A | 4/1966 | Grekel et al. |
| 3,327,782 A | 6/1967 | Hujsak |
| 3,480,082 A | 11/1969 | Gilliland |
| 3,719,749 A | 3/1973 | Smith et al. |
| 3,725,246 A | 4/1973 | Kmercak et al. |
| 3,918,263 A | 11/1975 | Swingle |
| 4,024,912 A | 5/1977 | Hamrick et al. |
| 4,114,688 A | 9/1978 | Terry |
| 4,141,417 A | 2/1979 | Schora et al. |
| 4,183,405 A | 1/1980 | Magnie |
| 4,186,800 A | 2/1980 | Allen |
| 4,239,499 A | 12/1980 | Pfefferle |
| 4,241,790 A | 12/1980 | Magnie |
| 4,250,230 A | 2/1981 | Terry |
| 4,261,420 A | 4/1981 | Hitzman |
| 4,299,286 A | 11/1981 | Alston |
| 4,372,386 A | 2/1983 | Rhoades et al. |
| 4,444,257 A | 4/1984 | Stine |
| 4,446,919 A | 5/1984 | Hitzman |
| 4,508,064 A | 4/1985 | Watanabe |
| 4,597,441 A | 7/1986 | Ware et al. |
| 4,622,275 A | 11/1986 | Noguchi et al. |
| 4,657,887 A | 4/1987 | Hardman et al. |
| 4,659,634 A | 4/1987 | Struthers |
| 4,687,491 A | 8/1987 | Latty |
| 4,691,771 A | 9/1987 | Ware et al. |
| 4,706,751 A | 11/1987 | Gondouin |
| 4,930,454 A | 6/1990 | Latty et al. |
| 5,033,940 A | 7/1991 | Baumann |
| 5,059,404 A | 10/1991 | Mansour et al. |
| 5,069,685 A | 12/1991 | Bissett et al. |
| 5,079,103 A | 1/1992 | Schramm |
| 5,089,532 A | 2/1992 | King et al. |
| 5,105,887 A | 4/1992 | Hewgill et al. |
| 5,128,307 A | 7/1992 | Wanjek et al. |
| 5,133,406 A | 7/1992 | Puri |
| 5,145,003 A | 9/1992 | Duerksen |
| 5,458,857 A | 10/1995 | Collins et al. |
| 5,590,518 A | 1/1997 | Janes |
| 5,674,053 A | 10/1997 | Paul et al. |
| 5,687,559 A | 11/1997 | Sato |
| 5,691,268 A | 11/1997 | Koveal et al. |
| 5,755,089 A | 5/1998 | Vanselow |
| 5,769,165 A | 6/1998 | Bross et al. |
| 5,769,610 A | 6/1998 | Paul et al. |
| 6,016,867 A | 1/2000 | Gregoli et al. |
| 6,016,868 A | 1/2000 | Gregoli et al. |
| 6,032,456 A | 3/2000 | Easom et al. |
| 6,159,434 A | 12/2000 | Gonjo et al. |
| 6,168,054 B1 | 1/2001 | Shelton, Jr. |
| 6,306,917 B1 | 10/2001 | Bohn et al. |
| 6,328,104 B1 | 12/2001 | Graue |
| 6,413,479 B1 | 7/2002 | Kudo et al. |
| 6,431,840 B1 | 8/2002 | Mashimo et al. |
| 6,458,478 B1 | 10/2002 | Wang et al. |
| 6,503,649 B1 | 1/2003 | Czajkowski et al. |
| 6,505,467 B1 | 1/2003 | Fjellhaug et al. |
| 6,506,359 B1 | 1/2003 | Maruko |
| 6,581,684 B2 | 6/2003 | Wellington et al. |
| 6,653,005 B1 | 11/2003 | Muradov |
| 6,821,501 B2 | 11/2004 | Matzakos et al. |
| 6,893,755 B2 | 5/2005 | Leboe |
| 6,899,859 B1 | 5/2005 | Olsvik |
| 6,986,797 B1 | 1/2006 | Clawson et al. |
| 7,040,390 B2 | 5/2006 | Tubel et al. |
| 7,056,482 B2 | 6/2006 | Hakka et al. |
| 7,064,097 B1 | 6/2006 | Cai et al. |
| 7,066,973 B1 | 6/2006 | Bentley et al. |
| 7,067,456 B2 | 6/2006 | Fan et al. |
| 7,089,907 B2 | 8/2006 | Shinagawa et al. |
| 7,100,692 B2 | 9/2006 | Parsley et al. |
| 7,156,886 B2 | 1/2007 | Nakamura et al. |
| 7,168,488 B2 | 1/2007 | Olsvik et al. |
| RE39,675 E | 6/2007 | Kudo et al. |
| 7,272,934 B2 | 9/2007 | Chandran et al. |
| 7,481,275 B2 | 1/2009 | Olsvik et al. |
| 7,506,685 B2 | 3/2009 | Zubrin et al. |
| 7,562,708 B2 | 7/2009 | Cogliandro et al. |
| 7,624,801 B2 | 12/2009 | Zubrin et al. |
| 7,650,939 B2 | 1/2010 | Zubrin et al. |
| 7,654,330 B2 | 2/2010 | Zubrin et al. |
| 7,753,972 B2 | 7/2010 | Zubrin et al. |
| 7,810,565 B2 | 10/2010 | Zubrin et al. |
| 7,918,906 B2 | 4/2011 | Zubrin et al. |
| 7,931,712 B2 | 4/2011 | Zubrin et al. |
| 7,937,948 B2 | 5/2011 | Zubrin et al. |
| 8,047,007 B2 | 11/2011 | Zubrin et al. |
| 8,450,536 B2 | 5/2013 | White et al. |
| 8,602,095 B2 | 12/2013 | Zubrin et al. |
| 8,616,294 B2 * | 12/2013 | Zubrin .............. E21B 43/164 |
| | | 166/268 |
| 8,785,699 B2 | 7/2014 | White et al. |
| 2001/0047040 A1 | 11/2001 | Agee et al. |
| 2002/0077374 A1 | 6/2002 | Jackson et al. |
| 2002/0083644 A1 | 7/2002 | Sata et al. |
| 2002/0083646 A1 | 7/2002 | Deshpande et al. |
| 2002/0090327 A1 | 7/2002 | Deshpande |
| 2002/0170714 A1 | 11/2002 | Davis et al. |
| 2002/0182462 A1 | 12/2002 | Ballantine et al. |
| 2003/0008186 A1 | 1/2003 | Dickman et al. |
| 2003/0037928 A1 | 2/2003 | Ramachandran et al. |
| 2003/0051405 A1 | 3/2003 | Childress et al. |
| 2003/0070808 A1 | 4/2003 | Allison |
| 2004/0161377 A1 | 8/2004 | Davey |
| 2004/0163311 A1 | 8/2004 | Ahmed et al. |
| 2004/0256116 A1 | 12/2004 | Olsvik et al. |
| 2005/0039400 A1 | 2/2005 | Lau et al. |
| 2005/0210881 A1 | 9/2005 | Balan et al. |
| 2006/0054318 A1 | 3/2006 | Sarada |
| 2006/0213657 A1 | 9/2006 | Berchenko et al. |
| 2006/0248800 A1 | 11/2006 | Miglin et al. |
| 2006/0272813 A1 | 12/2006 | Olsvik et al. |
| 2007/0004588 A1 | 1/2007 | Wang et al. |
| 2007/0099038 A1 | 5/2007 | Galloway |
| 2007/0130957 A1 | 6/2007 | Hoffmann et al. |
| 2007/0220810 A1 | 9/2007 | Leveson et al. |
| 2008/0053655 A1 | 3/2008 | Retallick et al. |
| 2008/0296018 A1 | 12/2008 | Zubrin et al. |
| 2009/0117024 A1 | 5/2009 | Weedon et al. |
| 2009/0123364 A1 | 5/2009 | Forsyth et al. |
| 2009/0158701 A1 | 6/2009 | Hoffmann et al. |
| 2009/0236093 A1 | 9/2009 | Zubrin et al. |
| 2011/0088896 A1 | 4/2011 | Preston |

(56) References Cited

U.S. PATENT DOCUMENTS

2011/0088897 A1    4/2011  Raman
2014/0065026 A1    3/2014  Zubrin et al.

FOREIGN PATENT DOCUMENTS

| CA | 2739420 C | 2/2013 |
| WO | 03/018958 A1 | 3/2003 |
| WO | 2005/007776 A1 | 1/2005 |
| WO | 2007/117933 A2 | 10/2007 |
| WO | 2008/074980 A1 | 6/2008 |

OTHER PUBLICATIONS

"Countercurrent exchange" From Wikipedia, the free encyclopedia, retrieved May 20, 2010 from http://en.wikipedia.org/wiki/Countercurrent_exchange.

Asghari and Al-Dliwe (2006) "Optimization of Carbon Dioxide Sequestration and Improved Oil Recovery in Oil Reservoirs" University of Regina, Saskatchewan, Canada, S4S 0A2.

Kuuskraa et al. (Feb. 2006) "Evaluating the Potential for 'Game Changer' Improvements in Oil Recovery Efficiency from CO2 Enhanced Oil Recovery" Prepared for U.S. Department of Energy Available Web Site: http://fossil.energy.gov/programs/oilgas/publications/eor_co2/Game_Changer_Document_2_06_with_appendix.pdf Accessed on Jan. 31, 2012.

\* cited by examiner

1300

250 mcf CO₂ per day

| | | H₂ Injected into Well | | | | | | | | H₂ for Electricity | | | |
|---|---|---|---|---|---|---|---|---|---|---|---|---|---|
| | | H₂ as effective as CO₂ | | | H₂ is 0.5 times CO₂ | | | H₂ is 2 times CO₂ | | | | | |
| Reformer Feed | Furnace Feed | Total Cost ($) | Total Value ($) | Multiplier | Total Cost ($) | Total Value ($) | Multiplier | Total Cost ($) | Total Value ($) | Multiplier | Electric Output (kW) | Total Cost ($) | Total Value ($) | Multiplier |
| Coal | Coal | 1,459 | 5,178 | 3.55 | 1,459 | 3,678 | 2.52 | 1,459 | 8,178 | 5.61 | 572 | 1,596 | 3,551 | 2.22 |
| Coal | Local oil | 1,953 | 5,001 | 2.56 | 1,953 | 3,501 | 1.79 | 1,953 | 8,001 | 4.10 | 572 | 2,090 | 3,374 | 1.61 |
| Coal | Methane | 1,755 | 4,893 | 2.79 | 1,755 | 3,393 | 1.93 | 1,755 | 7,893 | 4.50 | 572 | 1,892 | 3,265 | 1.73 |
| Coal | Propane | 2,004 | 4,893 | 2.44 | 2,004 | 3,393 | 1.69 | 2,004 | 7,893 | 3.94 | 572 | 2,141 | 3,265 | 1.53 |
| Methane | Coal | 2,981 | 8,437 | 2.83 | 2,981 | 5,437 | 1.82 | 2,981 | 14,437 | 4.84 | 1,144 | 3,118 | 5,182 | 1.66 |
| Methane | Local oil | 3,253 | 8,193 | 2.52 | 3,253 | 5,193 | 1.60 | 3,253 | 14,193 | 4.36 | 1,144 | 3,390 | 4,939 | 1.46 |
| Methane | Methane | 2,979 | 8,043 | 2.70 | 2,979 | 5,043 | 1.69 | 2,979 | 14,043 | 4.71 | 1,144 | 3,116 | 4,788 | 1.54 |
| Methane | Propane | 3,324 | 8,043 | 2.42 | 3,324 | 5,043 | 1.52 | 3,324 | 14,043 | 4.22 | 1,144 | 3,461 | 4,788 | 1.38 |
| Propane | Coal | 3,634 | 6,970 | 1.92 | 3,634 | 4,470 | 1.23 | 3,634 | 11,970 | 3.29 | 953 | 3,771 | 4,258 | 1.13 |
| Propane | Local oil | 3,565 | 6,847 | 1.92 | 3,565 | 4,347 | 1.22 | 3,565 | 11,847 | 3.32 | 953 | 3,702 | 4,135 | 1.12 |
| Propane | Methane | 3,428 | 6,772 | 1.98 | 3,428 | 4,272 | 1.25 | 3,428 | 11,772 | 3.43 | 953 | 3,565 | 4,060 | 1.14 |
| Propane | Propane | 3,601 | 6,772 | 1.88 | 3,601 | 4,272 | 1.19 | 3,601 | 11,772 | 3.27 | 953 | 3,738 | 4,060 | 1.09 |
| Local oil | Coal | 3,307 | 6,946 | 2.10 | 3,307 | 4,621 | 1.40 | 3,307 | 11,596 | 3.51 | 887 | 3,444 | 4,424 | 1.28 |
| Local oil | Local oil | 3,476 | 6,739 | 1.94 | 3,476 | 4,414 | 1.27 | 3,476 | 11,389 | 3.28 | 887 | 3,613 | 4,217 | 1.17 |
| Local oil | Methane | 3,243 | 6,611 | 2.04 | 3,243 | 4,286 | 1.32 | 3,243 | 11,261 | 3.47 | 887 | 3,380 | 4,089 | 1.21 |
| Local oil | Propane | 3,536 | 6,611 | 1.87 | 3,536 | 4,286 | 1.21 | 3,536 | 11,261 | 3.18 | 887 | 3,673 | 4,089 | 1.11 |
| Methanol | Coal | 6,589 | 4,749 | 0.72 | 6,589 | 3,249 | 0.49 | 6,589 | 7,749 | 1.18 | 572 | 6,726 | 3,122 | 0.46 |
| Methanol | Local oil | 6,360 | 4,684 | 0.74 | 6,360 | 3,184 | 0.50 | 6,360 | 7,684 | 1.21 | 572 | 6,497 | 3,057 | 0.47 |
| Methanol | Methane | 6,287 | 4,644 | 0.74 | 6,287 | 3,144 | 0.50 | 6,287 | 7,644 | 1.22 | 572 | 6,424 | 3,017 | 0.47 |
| Methanol | Propane | 6,379 | 4,644 | 0.73 | 6,379 | 3,144 | 0.49 | 6,379 | 7,644 | 1.20 | 572 | 6,516 | 3,017 | 0.46 |
| Methanol | Methanol | 6,701 | 4,654 | 0.69 | 6,701 | 3,154 | 0.47 | 6,701 | 7,654 | 1.14 | 572 | 6,838 | 3,027 | 0.44 |

1 MMcf (1,000 mcf) $CO_2$ per day

| Reformer Feed | Furnace Feed | $H_2$ Injected into Well ||||||||| $H_2$ for Electricity ||||
| | | $H_2$ as effective as $CO_2$ ||| $H_2$ is 0.5 times $CO_2$ ||| $H_2$ is 2 times $CO_2$ ||| | | | |
| | | Total Cost ($) | Total Value ($) | Multiplier | Total Cost ($) | Total Value ($) | Multiplier | Total Cost ($) | Total Value ($) | Multiplier | Electric Output (kW) | Total Cost ($) | Total Value ($) | Multiplier |
|---|---|---|---|---|---|---|---|---|---|---|---|---|---|---|
| Coal | Coal | 2,137 | 20,711 | 9.69 | 2,137 | 14,711 | 6.88 | 2,137 | 32,711 | 15.31 | 2,288 | 2,274 | 14,202 | 6.25 |
| Coal | Local oil | 4,113 | 20,005 | 4.86 | 4,113 | 14,005 | 3.41 | 4,113 | 32,005 | 7.78 | 2,288 | 4,250 | 13,497 | 3.18 |
| Coal | Methane | 3,321 | 19,570 | 5.89 | 3,321 | 13,570 | 4.09 | 3,321 | 31,570 | 9.51 | 2,288 | 3,458 | 13,062 | 3.78 |
| Coal | Propane | 4,318 | 19,571 | 4.53 | 4,318 | 13,571 | 3.14 | 4,318 | 31,571 | 7.31 | 2,288 | 4,455 | 13,062 | 2.93 |
| Methane | Coal | 8,225 | 33,746 | 4.10 | 8,225 | 21,746 | 2.64 | 8,225 | 57,746 | 7.02 | 4,576 | 8,362 | 20,729 | 2.48 |
| Methane | Local oil | 10,545 | 32,772 | 3.11 | 10,545 | 20,772 | 1.97 | 10,545 | 56,772 | 5.38 | 4,576 | 10,682 | 19,754 | 1.85 |
| Methane | Methane | 9,451 | 32,170 | 3.40 | 9,451 | 20,170 | 2.13 | 9,451 | 56,170 | 5.94 | 4,576 | 9,588 | 19,153 | 2.00 |
| Methane | Propane | 10,829 | 32,171 | 2.97 | 10,829 | 20,171 | 1.86 | 10,829 | 56,171 | 5.19 | 4,576 | 10,966 | 19,153 | 1.75 |
| Propane | Coal | 10,837 | 27,878 | 2.57 | 10,837 | 17,878 | 1.65 | 10,837 | 47,878 | 4.42 | 3,813 | 10,974 | 17,030 | 1.55 |
| Propane | Local oil | 11,795 | 27,390 | 2.32 | 11,795 | 17,390 | 1.47 | 11,795 | 47,390 | 4.02 | 3,813 | 11,932 | 16,542 | 1.39 |
| Propane | Methane | 11,246 | 27,088 | 2.41 | 11,246 | 17,088 | 1.52 | 11,246 | 47,088 | 4.19 | 3,813 | 11,383 | 16,240 | 1.43 |
| Propane | Propane | 11,937 | 27,088 | 2.27 | 11,937 | 17,088 | 1.43 | 11,937 | 47,088 | 3.94 | 3,813 | 12,074 | 16,241 | 1.35 |
| Local oil | Coal | 9,527 | 27,784 | 2.92 | 9,527 | 18,484 | 1.94 | 9,527 | 46,384 | 4.87 | 3,547 | 9,664 | 17,696 | 1.83 |
| Local oil | Local oil | 11,438 | 26,956 | 2.36 | 11,438 | 17,656 | 1.54 | 11,438 | 45,556 | 3.98 | 3,547 | 11,575 | 16,867 | 1.46 |
| Local oil | Methane | 10,508 | 26,445 | 2.52 | 10,508 | 17,145 | 1.63 | 10,508 | 45,045 | 4.29 | 3,547 | 10,645 | 16,356 | 1.54 |
| Local oil | Propane | 11,679 | 26,445 | 2.26 | 11,679 | 17,145 | 1.47 | 11,679 | 45,045 | 3.86 | 3,547 | 11,816 | 16,357 | 1.38 |
| Methanol | Coal | 22,657 | 18,997 | 0.84 | 22,657 | 12,997 | 0.57 | 22,657 | 30,997 | 1.37 | 2,288 | 22,794 | 12,489 | 0.55 |
| Methanol | Local oil | 22,973 | 18,738 | 0.82 | 22,973 | 12,738 | 0.55 | 22,973 | 30,738 | 1.34 | 2,288 | 23,110 | 12,229 | 0.53 |
| Methanol | Methane | 22,682 | 18,578 | 0.82 | 22,682 | 12,578 | 0.55 | 22,682 | 30,578 | 1.35 | 2,288 | 22,819 | 12,069 | 0.53 |
| Methanol | Propane | 23,049 | 18,578 | 0.81 | 23,049 | 12,578 | 0.55 | 23,049 | 30,578 | 1.33 | 2,288 | 23,186 | 12,069 | 0.52 |
| Methanol | Methanol | 24,338 | 18,618 | 0.76 | 24,338 | 12,618 | 0.52 | 24,338 | 30,618 | 1.26 | 2,288 | 24,475 | 12,109 | 0.49 |

Figure 14

SYSTEMS AND METHODS FOR GENERATING IN-SITU CARBON DIOXIDE DRIVER GAS FOR USE IN ENHANCED OIL RECOVERY

REFERENCE TO RELATED APPLICATIONS

This application is a continuation of U.S. Ser. No. 12/868,015, filed Aug. 25, 2010, entitled "SYSTEMS AND METHODS FOR GENERATING IN-SITU CARBON DIOXIDE DRIVER GAS FOR USE IN ENHANCED OIL RECOVERY", now U.S. Pat. No. 8,616,294, issued Dec. 31, 2013, which is a Continuation-in-Part (CIP) and claims priority from application U.S. Ser. No. 12/165,585, entitled "SYSTEMS FOR EXTRACTING FLUIDS FROM THE EARTH AND FOR GENERATING ELECTRICITY WITHOUT GREENHOUSE GAS EMISSIONS," filed on Jun. 30, 2008, now U.S. Pat. No. 7,810,565, issued Jan. 15, 2009, which itself is a Continuation of U.S. Ser. No. 11/751,028, entitled "PORTABLE AND MODULAR SYSTEM FOR EXTRACTING PETROLEUM AND GENERATING POWER," filed on May 20, 2007, and issued on Jan. 26, 2010 as U.S. Pat. No. 7,650,939, the entirety of all are hereby incorporated by reference herein.

FIELD OF THE INVENTION

This invention relates to a system and method for generating in-situ $CO_2$ from a carbonaceous feedstock for use in enhanced oil recovery. One embodiment of the present invention is a power plant which utilizes a steam reforming process that may be used to generate electricity, hydrogen, and high pressure carbon dioxide-rich gas which is utilized for EOR.

BACKGROUND OF THE INVENTION

The world's power demands are expected to rise 60% by 2030. With the worldwide total of active coal plants over 50,000 and rising, the International Energy Agency (IEA) estimates that fossil fuels will account for 85% of the energy market by 2030. Meanwhile, trillions of dollars worth of oil remain underground in apparently "tapped-out" wells. The present invention allows much of this domestic oil to be recovered, while generating clean, distributed electric power and reducing the amount of $CO_2$ released into the atmosphere from combustion of coal. As both oil and clean electricity ($CO_2$-emmission-free electricity) represent products whose high value today will only increase in the future, the potential profit from the present invention is quite large.

The U.S. currently produces approximately 5.1 million barrels of oil a day. Most of the oil fields in the U.S. are declining in oil recovery productivity. It has been proven that using $CO_2$ for Enhanced Oil Recovery (EOR) can increase oil recovery productivity in the declining fields. The U.S. Department of Energy (DOE) conducted several studies and has deemed $CO_2$-EOR to be the most promising solution to increase oil recovery productivity. The DOE estimates that 100 million barrels of "stranded" oil can be recovered using $CO_2$-EOR.

The DOE states that "while a mature hydrocarbon province, the U.S. still has 400 billion barrels of undeveloped technically recoverable oil resource. Undeveloped domestic oil resources still in the ground (in-place) total 1,124 billion barrels. Of this large in-place resource, 400 billion barrels is estimated to be technically recoverable. This resource includes undiscovered oil, "stranded" light oil amenable to $CO_2$-EOR technologies, unconventional oil (deep heavy oil and oil sands) and new petroleum concepts (residual oil in reservoir transition zones). The U.S. oil industry, as the leader in enhanced oil recovery technology, faces the challenge of further molding this technology towards economically producing these more costly remaining domestic oil resources. Of the 582 billion barrels of oil in-place in discovered fields, 208 billion has been already produced or proven, leaving behind 374 billion barrels. A significant portion of this 374 billion barrels is immobile or residual oil left behind ("stranded") after application of conventional (primary/secondary) oil recovery technology. With appropriate enhanced oil recovery (EOR) technologies, 100 billion barrels of this 'stranded' resource may become technically recoverable from already discovered fields."

There are tens of thousands of depleted oil and natural gas wells around the world, which collectively possess significant amounts of petroleum resources that cannot currently be extracted using conventional extraction techniques. For example, in a typical oil well, only about 30% of the underground oil is recovered during initial drilling ("primary recovery"). An additional approximately 20% may be accessed by "secondary recovery" techniques such as water flooding. In recent years, "tertiary recovery" (also known as "Enhanced Oil Recovery," or EOR) techniques have been developed to recover additional oil from depleted wells. Such tertiary recovery techniques include thermal recovery, chemical injection, and gas injection. Using current methods, these tertiary techniques allow for an additional 20% or more of the oil to be recovered.

Gas injection is one of the most common EOR techniques. In particular, carbon dioxide ($CO_2$) injection into depleted oil wells has received considerable attention owing to its ability to mix with crude oil. Since the crude oil is miscible with $CO_2$, injection of $CO_2$ renders the oil substantially less viscous and more readily extractable.

Despite the potential advantages of $CO_2$ in enhanced recovery, its use has been hampered by several factors. For instance, in order for the enhanced recovery process to be economically viable, the $CO_2$ gas must be naturally available in copious supplies at reasonable cost at or near the site of the oil well. Alternatively, $CO_2$ can be produced from industrial applications such as natural gas processing, fertilizer, ethanol and hydrogen plants where naturally occurring $CO_2$ reservoirs are not available. The $CO_2$ must then be transported over large distances via pipeline and injected at the well site. Unfortunately, such $CO_2$ pipelines are difficult and costly to construct.

For most oil fields, a $CO_2$ pipeline is not a viable option because of a mix of several problems: (a) The capital investment for building a pipeline—sometimes tens or hundreds of millions of dollars; (b) The time-frame of building a pipeline—several years; (c) The distance and terrain issues between the source and destination which either makes the pipeline impossible or simply not economical; (d) The time it takes to obtain easement rights and permits is long; and (e) The time it takes to start generating an increase in productivity—the return on investment (ROI) is too long.

For example, Anadarko Petroleum Corporation built a 125-mile $CO_2$ pipeline in Wyoming from an ExxonMobil gas plant to Salt Creek, Wyo., a 100-year old oil field. They expect to increase production from approx. 5,000 bbl/day in 2005 to approx. 30,000 bbl/day by 2010. However, the project cost hundreds of millions of dollars, and took over 5 years of planning, permitting, and construction to complete. Therefore, when faced with the hurdles and overall costs of the pipeline-delivered $CO_2$, as described above, tertiary $CO_2$ EOR simply does not make economical sense for most oil fields, especially small producers scattered all over the United States and the world.

In the past, the idea of using the exhaust from fossil-fuel fired electricity plants for EOR has been widely discussed. However, the electrical industry, for reasons of economy of scale, has based itself primarily on large (500 MWe to 1000 MWe) central power stations, located near their primary metropolitan markets. For many reasons, including notably those laid out above, as well as the fact that flue gases from conventional fossil power plants typically contain relatively low (<10%) $CO_2$ concentrations, such stations offer little potential utility for supporting EOR, especially by small producers.

Another gas that can potentially be used for enhanced recovery purposes is hydrogen. However, hydrogen has received considerably less attention than $CO_2$. Hydrogen, although somewhat soluble with oil, is believed less so than $CO_2$. Moreover, traditionally, hydrogen has been costly to produce and its use has not been justified from an economic standpoint.

The rising cost of crude oil, as high as $120 to $140 per barrel in the summer of 2008, and well over $70 per barrel in 2010 during the midst of a large economic recession, has increased interest in new enhanced oil recovery technologies. Simultaneously, the low cost of coal and biomass, often lower than $40 per ton, as well as the low cost of natural gas, have made carbonaceous feedstocks attractive fuel sources for EOR purposes.

Accordingly, as recognized by the present inventors, what are needed are a novel method, apparatus, and system for extracting oil/petroleum from the ground or from oil wells, such as depleted oil wells, by utilizing driver gases generated from a carbonaceous fuel source. What are also needed are a method, apparatus, and system for extracting natural gas from the ground or from natural gas wells by utilizing driver gases generated from a carbonaceous fuel source.

Therefore, it would be an advancement in the state of the art to provide an apparatus, system, and method for generating large quantities of carbon dioxide, hydrogen and other gases from a carbonaceous fuel source at low cost at or near an oil site.

It is against this background that various embodiments of the present invention were developed.

BRIEF SUMMARY OF THE INVENTION

Accordingly, one embodiment of the present invention is an in-situ apparatus for generating carbon dioxide gas at an oil site for use in enhanced oil recovery (EOR). The apparatus includes a steam generator adapted to boil and superheat water to generate a source of superheated steam, as well as a source of essentially pure oxygen. The apparatus also includes a steam reformer adapted to react a carbonaceous material with the superheated steam and the pure oxygen, in an absence of air, to generate a driver gas comprising primarily carbon dioxide gas and hydrogen gas. A separator is adapted to separate at least a portion of the carbon dioxide gas from the rest of the driver gas to generate a carbon dioxide-rich driver gas and a hydrogen-rich fuel gas. A compressor is used for compressing the carbon dioxide-rich driver gas for use in enhanced oil recovery, and the compressed carbon dioxide-rich driver gas, with substantially no oxygen, is injected to a predetermined depth in order to enhance oil recovery at the oil site. Unlike traditional CO2-EOR, which requires large power plants stationed near metropolitan areas and expensive pipeline networks, the in-situ apparatus can be placed or constructed at or near the site of the oil field, while a portion of the carbonaceous material may be obtained from a site outside the oil field.

Yet another embodiment of the present invention is the apparatus described above, where the carbonaceous material is selected from the group consisting of coal, biomass, natural gas, crude petroleum, ethanol, methanol, and trash, and/or mixtures thereof.

Yet another embodiment of the present invention is the apparatus described above, where a gas turbine is adapted to utilize a portion of the hydrogen-rich fuel gas to generate electricity, and waste heat from the gas turbine is used to provide heat needed to boil water.

Yet another embodiment of the present invention is the apparatus described above, where the electricity generated has substantially less associated carbon dioxide emissions than electricity generated from the combustion of the carbonaceous material, including coal and/or natural gas.

Yet another embodiment of the present invention is the apparatus described above, where the driver gas further comprises residual carbon monoxide, and wherein the apparatus further comprises a water gas-shift reactor disposed downstream of the steam reformer for converting the residual carbon monoxide into additional carbon dioxide gas and additional hydrogen gas.

Yet another embodiment of the present invention is the apparatus described above, where the driver gas further comprises residual carbon monoxide, and the apparatus further comprises a methanation reactor disposed downstream of the steam reformer for converting the residual carbon monoxide into methane.

Yet another embodiment of the present invention is the apparatus described above, further comprising a furnace adapted to utilize a portion of the hydrogen-rich fuel gas to generate heat necessary to drive the steam reformer.

Yet another embodiment of the present invention is the apparatus described above, further comprising a heat exchanger disposed between the steam generator and the furnace adapted to exchange heat between the hot gas exiting the furnace and the steam generated by the steam generator.

Yet another embodiment of the present invention is the apparatus described above, further comprising a heat exchanger disposed between the steam generator and the steam reformer adapted to exchange heat between the hot driver gas exiting the steam reformer and the steam generator in order to boil and superheat water into superheated ("dry") steam.

Yet another embodiment of the present invention is the apparatus described above, further comprising a condenser disposed after the heat exchanger adapted to condense and cool the driver gas before entering the separator.

Yet another embodiment of the present invention is the apparatus described above, further comprising a heat exchanger disposed between the steam reformer and the steam reformer adapted to exchange heat between the hot driver gas exiting the steam reformer and the steam entering the steam reformer.

Yet another embodiment of the present invention is the apparatus described above, where the steam reformer operates at a temperature of approximately 600° C. to 1000° C.

Yet another embodiment of the present invention is the apparatus described above, where the steam reformer operates at a pressure of approximately 5 bar to 100 bar.

Yet another embodiment of the present invention is the apparatus described above, where the $CO_2$ separator is a methanol-based separator.

Yet another embodiment of the present invention is the apparatus described above, where the separator operates in a temperature-swing cycle between approximately −60° C. and +40° C., and a pressure-swing cycle between approximately 1 bar and 100 bar.

Yet another embodiment of the present invention is the apparatus described above, further comprising a control system adapted to control an operation of the apparatus based on a temperature, a pressure, and a gas composition of the driver gas in real-time by controlling an input oxygen-to-steam ratio.

Yet another embodiment of the present invention is the apparatus described above, where the steam reformer is selected from the group consisting of a fixed bed reformer, a fluidized bed reformer, and an entrained-flow reformer.

Another embodiment of the present invention is a method for generating carbon dioxide gas at an oil field site for use in enhanced oil recovery. The method includes the steps of providing a source of superheated steam, and providing a source of essentially pure oxygen. Then, steam reforming a carbonaceous material with the superheated steam and the pure oxygen to generate a driver gas comprising primarily carbon dioxide gas and hydrogen gas. Next, separating at least a portion of the carbon dioxide gas from the driver gas to generate a carbon dioxide-rich driver gas and a hydrogen-rich fuel gas, compressing the carbon dioxide-rich driver gas for use in enhanced oil recovery, and injecting the compressed portion of the carbon dioxide-rich driver gas, with substantially no oxygen, to a predetermined depth in order to enhance oil recovery at the oil site. The steam reforming reaction is performed adjacent to the oil field site and in an absence of air.

Yet another embodiment of the present invention is the method described above, where the carbonaceous material is selected from the group consisting of coal, biomass, natural gas, crude petroleum, ethanol, methanol, and trash.

Yet another embodiment of the present invention is the method described above, further comprising using a portion of the hydrogen-rich fuel gas to generate electricity for beneficial use on-site or transfer to an electrical grid.

Yet another embodiment of the present invention is the method described above, further comprising utilizing a water gas-shift reaction downstream of the steam reforming reaction to convert residual carbon monoxide in the driver gas into additional carbon dioxide gas and additional hydrogen gas.

Other features, utilities and advantages of the various embodiments of the invention will be apparent from the following more particular description of embodiments of the invention as illustrated in the accompanying drawings.

BRIEF DESCRIPTION OF THE DRAWINGS

FIG. 13 illustrates an economic model comparing financial multipliers for various fuel combinations for a system generating 250 mcf of carbon dioxide per day;

FIG. 14 illustrates an economic model comparing financial multipliers for various fuel combinations for a system generating 1,000 mcf (1 MMcf) of carbon dioxide per day.

DETAILED DESCRIPTION OF THE INVENTION

Figure 1A:
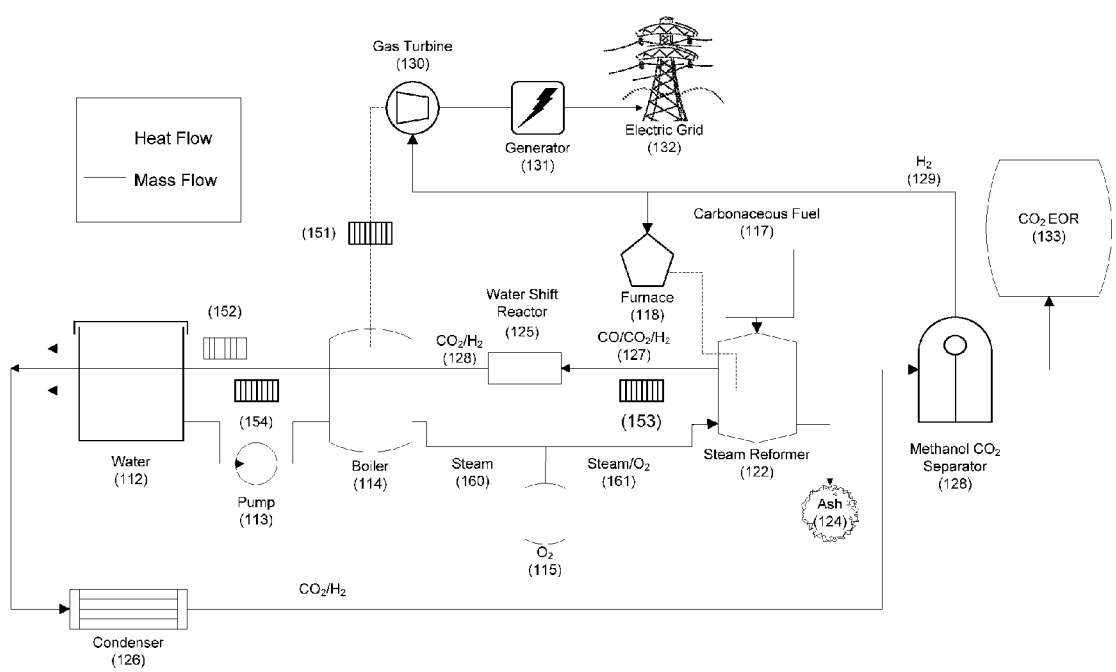
FIG. 1A illustrates an example of an embodiment of a power plant according to the present invention for the reformation of super-heated high-pressure steam with carbonaceous material to create a gaseous mixture rich in hydrogen and carbon dioxide gas in which the hydrogen combusts in a gas turbine for electricity generation while the carbon dioxide gas is used for EOR.

This innovative power plant design utilizes efficient reformation of carbonaceous fuel and steam to improve upon traditional combustion methods of fuel and air which currently dominate the power generation industry. The reformation of carbonaceous fuel allows power plants to contribute to the hydrogen economy by producing hydrogen for less energy than the hydrogen provides. This design also allows for sequestration and/or beneficial use of $CO_2$ for a variety of applications such as the recovery of otherwise inaccessible oil, fire extinguishers, welding, pneumatic systems, biological applications, and chemical processing.

The hydrogen is either burned to produce clean electricity, to be sold to utilities or used for other uses such as a chemical production, fuel cell application, or enhanced oil recovery, depending on which of these methods produce higher monetary value to the operator.

If biomass is used as the fuel source, as a result of the fact that the $CO_2$ injected into the ground comes from biomass, whose carbon came from the atmosphere, the electricity generation process of the power plant design not only produces power without emission of $CO_2$ into the environment, it may actually reduce atmospheric $CO_2$. In fact, in one embodiment, the amount of carbon sequestered in the process may be on average about 5-30%, and preferably 20-30%, greater than the amount of carbon in the oil recovered. Thus, not only the electricity, but even the oil produced by the enhanced oil recovery process can be said to be truly "green," since it has been fully paid for by the carbon sequestered to get it.

Throughout this disclosure, the symbol "kcf" and "mcf" both shall stand for "thousand standard cubic feet," usually of $CO_2$ unless explicitly stated otherwise. The symbol "MMcf" shall stand for "million standard cubic feet," usually of $CO_2$ unless explicitly stated otherwise. That is, a reformer that produces 1 kcf/day of driver gas produces 1,000 standard cubic feet of driver gas per day, while a reformer that produces 1 MMcf/day of driver gas produces 1,000,000 standard cubic feet of driver gas per day. The word "day" shall mean "a day of operations," which could be an 8-hour day, a 12-hour day, a 24-hour day, or some other amount of time.

Steam Reforming of Biomass and $H_2$ Used to Generate Electricity

One of many illustrative scenarios is presented here to demonstrate the potential profitability of the reformation power plant design. In this scenario, biomass is used as the carbonaceous material feedstock; the $CO_2$ produced is used for EOR, while all of the hydrogen is used for power generation.

In the past, the idea of using the exhaust from fossil-fuel fired power plants for EOR has been widely discussed. However, the electrical industry, for reasons of economies of scale, has based itself primarily on large (500 MWe to 1000 MWe) central power stations, located near their primary metropolitan markets. For many reasons, including notably those laid out above, as well as the fact that flue gases from conventional fossil power plants typically contain relatively low (<10%) $CO_2$ concentrations, such stations offer little potential utility for supporting EOR, particularly for small producers.

In contrast, the current invention may be built on or taken directly to the site of an oil field. The system is made up of three primary components: steam reformer, gas separator, and gas turbine electrical generation system.

Steam reformation of biomass occurs approximately in accord with the following reaction:

$$C_4H_6O_3 + 3H_2O + O_2 \rightarrow 4CO_2 + 6H_2 \quad \Delta H = +4 \text{ kcal/mole} \quad (1)$$

This reaction is nearly energetically neutral, and if carried out completely in accord with reaction (1), will produce a gas mixture that is 40% $CO_2$. This concentration may be reduced somewhat by reverse water gas shift side reactions that may occur, or increased as a result of methanation reactions:

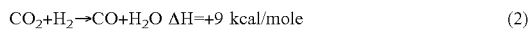

$$CO_2 + H_2 \rightarrow CO + H_2O \quad \Delta H = +9 \text{ kcal/mole} \quad (2)$$

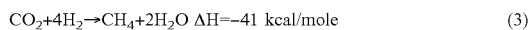

$$CO_2 + 4H_2 \rightarrow CH_4 + 2H_2O \quad \Delta H = -41 \text{ kcal/mole} \quad (3)$$

However, on net, a $CO_2$ concentration (in the gas after water knockout) approaching 40% can be achieved. This $CO_2$ concentration is much higher than that available in combustion flue gas, and is very favorable for $CO_2$ separation. Examining equation (1), we can see that only one $O_2$ molecule is needed for every four $CO_2$ molecules produced, a small ratio which makes the use of oxygen in place of air practical. Assuming that one of the four $CO_2$ molecules produced by reaction (1) is consumed by reaction (3), and we use the extra energy to cut the oxygen input, we obtain a net reaction:

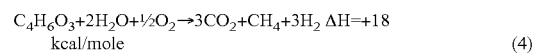

$$C_4H_6O_3 + 2H_2O + \tfrac{1}{2}O_2 \rightarrow 3CO_2 + CH_4 + 3H_2 \quad \Delta H = +18 \text{ kcal/mole} \quad (4)$$

Reaction (4) is best done at high pressure, with 10 bar being adequate for good results. Since the only gas that needs to be fed into the system is a small amount of oxygen (the water can be initially pressured in the liquid phase), the required compression energy is minimal. Running reaction (4) at high pressure also has the advantage of producing high pressure exhaust gas, which simplifies the task of separating the $CO_2$ from the other product gases.

In experiments done to date, using a combined oxygen-steam feed (1 part oxygen to 6 parts steam by mole) reacting with charcoal at 10 bar, gas outputs with a composition of 55% hydrogen, 2% methane, 8% CO, and 35% $CO_2$ have been obtained. Such high fraction $CO_2$ produced at pressure is much more susceptible to separation than the ~10% $CO_2$ at 1 bar produced in ordinary combustion system flue gas. With further adjustments to the system, even closer approximations to the ideal yields given by equation (4) are attainable.

Carbon dioxide is approximately two orders of magnitude more soluble in methanol than any of methane, hydrogen, nitrogen, oxygen, or carbon monoxide. The methanol also acts as a trap, removing sulfur impurities from the gas stream. Large amounts of $CO_2$ absorbed at low temperature and high pressure at one column can then be out-gassed in nearly pure form in a second column operating at low pressure and higher temperature. In experiments done to date, using a two column combined pressure and temperature swing cycling methanol system, the inventors have shown that at 10 bar pressure and −40° C., methanol will take in to solution about 75 grams per liter of $CO_2$ from a 20% $CO_2$/80% $N_2$ gas mixture, with less than 4 grams/liter of $N_2$ entrained. In the demonstrated system, product gas purities of 92% $CO_2$ can be obtained from a 20% $CO_2$ feed, with 90% of the input $CO_2$ in the feed gas stream being captured into the product stream. The 92% pure output $CO_2$ stream can then be liquefied. In the process of liquefaction, nearly pure $CO_2$ is obtained, which can be brought to whatever high pressure is required for underground injection at little energy cost.

Let us consider the economics of an in-situ reformer power plant located at or near an oil field. Depending on the field, it takes between 5,000 and 10,000 cubic feet of $CO_2$ to produce 1 barrel of oil. We adopt the more conservative number of 10,000 cubic feet/bbl. In that case, it will take 560 metric tons of $CO_2$ per day to produce 1,000 barrels of oil per day. Examining reaction (4), we see that 3 $CO_2$ molecules with a total molecular weight of 132 are produced for every unit of biomass with a molecular weight of 102, for a weight ratio of about 1.3. Thus, producing 560 metric tons of $CO_2$ will require 430 tons of biomass. Currently, corn stover can be obtained for about $40 per ton, delivered cost, within 50 miles. Thus, 430 tons of corn stover would go for a cost of about $17,200. Other forms of crop or forestry residues, or even coal, could potentially be obtained much cheaper, depending upon the locality, but we will use commercially priced corn stover in our analysis to be conservative. This would allow the production of 1,000 barrels of oil, which at a price of $60/bbl, would be worth $60,000.

However, in addition to the oil product, the system also produces electricity. At the same time that 560 metric tons of $CO_2$ are produced, the power plant also produces 68 tons of methane and 25.4 tons of hydrogen. If burned in air, these will produce 2,000 MWt-hours of energy. Assuming 30% efficiency, this translates into 600 MWe-hours of power, which at a price of $0.05/kWh, would sell for $30,000. The power output of the system would be 25 MWe, which is well within the range of many gas turbine units produced by industry. It may be further noted that the revenue from electricity alone significantly exceeds the cost of feedstock (and other daily costs, outlined below).

Adding the $30,000 per day revenue from electricity to the $60,000 earned from oil, we see that a total gross income of $90,000 per day can be obtained at a cost of $17,200 in feedstock. Assuming labor costs of $4,000 per day and capital and depreciation costs of $4,100 per day (assuming a per unit capital cost of $15 million, paid off at 10% per year), total daily operating costs would be $25,300. Thus the net profit of the operation would be $64,700 per day, or about $23.6 million per year.

Therefore, using the principles taught by the present invention, profitable hydrogen production and clean electricity and oil production may become economically feasible.

The Long-Felt, Unsolved Need for On-Site $CO_2$ Production for EOR

Carbon dioxide ($CO_2$) flooding potential for enhanced oil recovery (EOR) has been effectively demonstrated in the U.S., particularly in the Permian Basin of west Texas and southeast New Mexico. Much of the research on $CO_2$ flooding can be applied to other gas flooding processes. Today over 350,000 BOPD (barrels of oil per day) are being produced by gas injection in the U.S.; approximately 70% of this oil, or over 260,000 BOPD is from $CO_2$ injection projects. With present oil prices around $75 per barrel, this $CO_2$ oil production represents about $9 billion less in imports each year, and provides a significant number of domestic jobs as well. Out of the 350 billion barrels remaining in U.S. oil reserves, the amount of oil presently produced by $CO_2$ flooding barely scratches the surface of this resource. The potential recovery is at least an order of magnitude greater.

There are a number of reasons that $CO_2$ is not more widely used. Two significant reasons that are overcome by an on-site $CO_2$ production technology are: 1) fields too small even if relatively near a major pipeline to justify construction of a pipeline, and 2) no relatively low cost $CO_2$ available.

It is a major undertaking to install a pipeline. Hindrances include the right of way, environmental impact, guarantee of long-term users, guarantee of long-term consistent source, timeliness of availability, and size of economy. A small field will unlikely justify a pipeline of any size or distance. If $CO_2$ can be produced on site economically in quantities (1-10 MMCFD, millions of cubic feet per day) sufficient for one to a few dozen injection wells, $CO_2$-EOR would be available for any size field. As an example of the potential in the U.S., there are several isolated relatively small $CO_2$-EOR projects developed near industrial sources of $CO_2$ (for example, the Muffin Drilling in Kansas with one field, Core Energy in Michigan with 8 fields, and Chaparral Energy in Oklahoma with two fields). These range in size from one injector to 40 injectors, with production from 3 to 1100 BOPD. It requires 5-10 MCF of $CO_2$ to increase production by about 1 BBL. Future projects are looking at $50-80 per BBL for oil. If the cost of $CO_2$ is kept under 50% of the cost of the oil, and the low-end is considered, then we are looking at <$25, or $2.50 MCF (<$45/ton), for $CO_2$ if we consider 10 MCF/incremental barrel of oil.

A process that can provide $CO_2$ at a relatively low cost in about any quantity required would open up about half of the oil fields in the U.S. for miscible $CO_2$ flooding EOR. If immiscible $CO_2$ flooding EOR is included (heavy oil and/or shallow reservoir), this would open up most fields in the U.S. These two processes generally increase oil recover above conventional process 5 to 15% of the original oil in place (OOIP).

A U.S. Department of Energy (DOE) report published in February 2006, which was one of the factors that inspired the inventors to develop this technology, entitled "EVALUATING THE POTENTIAL FOR 'GAME CHANGER' IMPROVEMENTS IN OIL RECOVERY EFFICIENCY FROM $CO_2$ ENHANCED OIL RECOVERY," (hereinafter, "the DOE Report"), states, inter alia:

"The United States has a large and bountiful storehouse of oil resources, estimated at nearly 600 billion barrels of oil in-place in already discovered oil fields. Currently used primary/secondary oil recovery methods recover only about one-third of this resource, leaving behind ("stranding") a massive target for enhanced oil recovery.

"Important steps have been taken by industry to improve the recovery efficiency in domestic oil reservoirs, notably in applying thermal enhanced oil recovery (TEOR) methods to the shallow, heavy oil fields of California and $CO_2$-EOR to the deeper, light oil fields of West Texas. To date, these improved oil recovery technologies have provided about 14 billion barrels of domestic oil production and reserves, adding about 3 percent to domestic oil recovery efficiency.

"Even including the important steps taken so far by industry, the overall domestic oil recovery efficiency remains low. This reflects production and proving of 208 billion barrels out of a resource in-place of 582 billion barrels, in already discovered fields . . . . Including all these oil resources, truly massive volumes of domestic oil—a trillion barrels—remain 'stranded,' after application of currently used primary/secondary oil recovery . . . :

"Approximately 374 billion barrels of "stranded" oil remains in already discovered domestic oil fields, even after application of traditional TEOR and $CO_2$-EOR technology." (DOE Report, page 1, emphasis added.)

The DOE Report goes on to say, inter alia:

"The causes of less-than-optimum, past-performance and only modest oil recovery by $CO_2$-EOR include the following: The great majority of past-$CO_2$ floods used insufficient volumes of $CO_2$ for optimum oil recovery, due in part to high $CO_2$ costs relative to oil prices and the inability to control $CO_2$ flow through the reservoir" (DOE Report, page 8).

The DOE Report goes on to state that these "game changer" advances in $CO_2$-EOR have not yet been developed: "However, the reader should note that significant new investments are required in research and technology development for $CO_2$-EOR to provide the increased domestic oil resources and to realize the higher oil recovery efficiencies set forth in this report" (DOE Report, pages 5 and 42).

Thus, according to the DOE, if $CO_2$ can be made more widely available, there would be a very large and highly profitable market for its application.

In addition, William A. Jones, who has over 32 years of experience in the oil and gas industry, including serving for five years on the Board of Directors for IPAMS (Independent Petroleum Association of Mountain States), has stated that based on his extensive knowledge and experience in the oil industry, that there has been a long-felt and unsolved need for on-site $CO_2$ production. As stated in the cited DOE Report, the long-felt need was a recognized problem that has existed in the art for a long period of time without solution. The need has been a persistent one that was recognized by those of ordinary skill in the art, but no solution was known. Long-felt need was identified and articulated at least since the early $CO_2$ floods in 1970s, and there were many efforts to solve the problem. Examples of previous efforts to solve the problem included transporting $CO_2$ by trucks, piping $CO_2$ from ethanol plants, piping $CO_2$ from electric power plants, building interstate networks of pipelines, portable nitrogen generation ($N_2$ is similar, but not as effective as $CO_2$), and many others. All of these attempts were found to be uneconomical and unsuccessful for most oil fields. The failure to solve the long-felt need was not due to factors such as lack of interest or lack of appreciation of an invention's potential or marketability. The long-felt need has not been satisfied by any other before this invention, which does in fact satisfy the long-felt need.

Preferred System Block Diagram

FIG. 1A shows a block diagram of a preferred embodiment of a reformer power plant system 100. Water from water tank 112 is compressed in a pump 113 into boiler 114, where it is boiled and brought to approximately 180° C., the boiling point of water at 10 bar. Oxygen 115 is added to the steam to create a mixture of steam and oxygen 161. The steam-oxygen mixture 161 then passes through heat exchanger 153, where heat from exiting hot gas pre-heats the steam-oxygen mixture 161 and cools the exiting gas, increasing the overall efficiency of the system 100. Carbonaceous fuel 117 and hot steam-oxygen mixture 161 enter steam reformer 122, which operates at approximately 800° C. and 10 bar. Ash is collected in ash tray 124, from the bottom of the steam reformer 122. The heat to drive steam reformer 122 may be provided by furnace 118, which is fueled by hydrogen gas. Exiting high-pressure gas passes through heat exchanger 153, pre-heating the steam-oxygen mixture 161 from boiler 114. The exiting high pressure gas 127, which is primarily a mixture of $CO_2$, CO, and $H_2$, then passes through a water-gas shift reactor 125, which converts any residual CO into additional $CO_2$ and $H_2$ (128). The $CO_2$ and $H_2$ (127) passes around boiler 114 and water tank 112, further releasing heat to these elements via heat exchanger 154. Finally, exiting driver gas 128 is passed through condenser 126, before being fed to methanol $CO_2$ separator 128, the operation of which is described in greater detail below. At this point, the high pressure gas is composed primarily of carbon dioxide and hydrogen gas, but may also include minor constituents of methane gas and carbon monoxide gas, as well as possibly other gases. The methanol $CO_2$ separator 128 produces a $CO_2$ gas stream comprised essentially of $CO_2$, and a fuel stream 129 comprised primarily of hydrogen, but also methane, carbon monoxide, and possibly other gases. The $CO_2$ gas stream may be used for EOR 133, or for other purposes. The fuel gas stream 129 is fed into gas turbine 130, as well as furnace 118. Gas turbine 130 produces electricity via generator 131, which may be used locally or fed to the grid 132. Furnace 118 burns a portion of the fuel gas in order to generate the heat necessary to drive the reforming reaction taking place in the steam reformer 122.

Optionally, additional heat exchangers, such as heat exchangers 151 and 152 may be used to exchange heat between the hot exhaust gas exiting the gas turbine and the boiler 114 and water tank 112 to pre-heat and then boil water.

Alternatively, a methanation reactor (not shown in FIG. 1) may be disposed downstream of the steam reformer for converting the residual carbon monoxide into methane. As noted previously, the high-pressure gas may also include residual methane, which is advantageous, since it makes it easier to combust the hydrogen gas in the gas turbine.

The boiler 114 may operate at a temperature of approximately 150° C. to 250° C.

The steam reformer 122 may operate at a temperature of approximately 600° C. to 1000° C., and a pressure of approximately 5 bar to 100 bar. The steam reformer may be a fixed bed reformer, a fluidized bed reformer, or an entrained-flow reformer, or another steam reformer design known in the art.

The methanol $CO_2$ separator 128 may operate in a temperature-swing cycle between approximately −60° C. and +40° C., a pressure-swing cycle between approximately 1 bar and 100 bar, or a combined temperature-pressure-swing cycle.

The apparatus may also include a control system adapted to control an operation of the apparatus based on a market price of carbonaceous material, a market price of electricity, and a market price of crude petroleum (as described in greater detail below).

The apparatus may also include a control system adapted to control an operation of the apparatus based on a temperature, a pressure, and a gas composition of the driver gas in real-time by controlling an input oxygen-to-steam ratio. Such a control system may be implemented using negative feedback control on the injection of oxygen-to-steam ratio into the steam reformer.

The carbon dioxide-rich driver gas is preferably at least 70% $CO_2$ by weight, but more preferable at least 90% $CO_2$ by weight, and even more preferably at least 97% $CO_2$ by weight, and even more preferably greater than 99% $CO_2$ by weight.

Figure 1B:
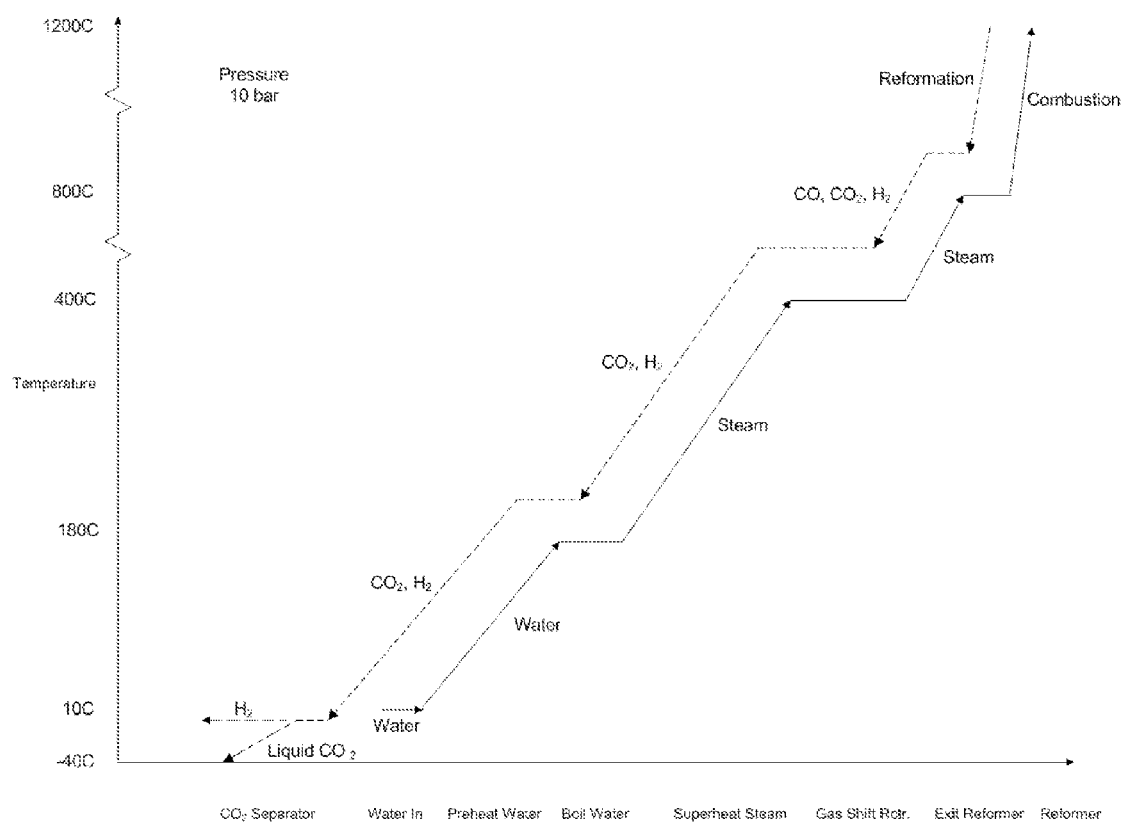
FIG. 1B illustrates a sample temperature diagram illustrating transfer of heat between hot driver gas exiting the steam reformer and water/steam entering the steam reformer in order to maximize thermal efficiency according to one embodiment of the present invention.

Heat exchangers, while optional and not a required component of the present invention, can be used to greatly increase the thermal efficiency of the power plant shown in FIG. 1A. Accordingly, FIG. 1B shows an illustrative temperature profile showing placement of heat exchangers wherever there is a temperature difference between hot driver gas exiting the steam reformer and water/steam entering the steam reformer. As shown in FIG. 1B, water at ambient temperature of approximately 10° C. enters the system, where it is preheated by a heat-exchanger to slightly less than 180° C. by residual heat in the hot driver gas exiting the system. After the water is preheated, it is brought to boiling by the boiler at a temperature of approximately 180° C., since at a pressure of 10 bar, water boils at approximately 180° C. After the water—now steam—exits the boiler, it is further superheated into superheated ("dry") steam via another heat exchanger by the hot driver gas exiting the water-gas-shift reactor and brought to approximately 400° C. The steam, now at approximately 400° C., passes through a water-gas-shift reactor, where it reacts with any residual carbon monoxide (CO) exiting the steam reformer. After passing through the water-gas-shift reactor, the steam is further superheated to approximately 800° C. in another heat exchanger before it enters the steam reformer by exchanging heat with the hot driver gas exiting the steam reformer. Inside the steam reformer, temperatures can be as high as 1200° C., depending on the ratio of steam:oxygen injected into the steam reformer. As the water/steam is pre-heated throughout this process, as shown in FIG. 1B, hot driver gas is cooled as it exchanges heat with the water/ steam. After the driver gas is finished exchanging heat with the incoming water, it may be further thermally grounded via any appropriate thermal ground source, such as a river. The thermally-grounded driver gas may further pass through a condenser, and finally enter the methanol separator, which produces a liquid stream of $CO_2$ at a temperature of approximately −40° C. There may be further heat exchangers located inside the separator. In short, the driver gas is cooled by using the useful heat to pre-heat water. The example given here and shown in FIG. 1B is illustrative only of the principles of the present invention's heat exchanger design, and is not intended to limit the scope of the present invention.

Figure 2:
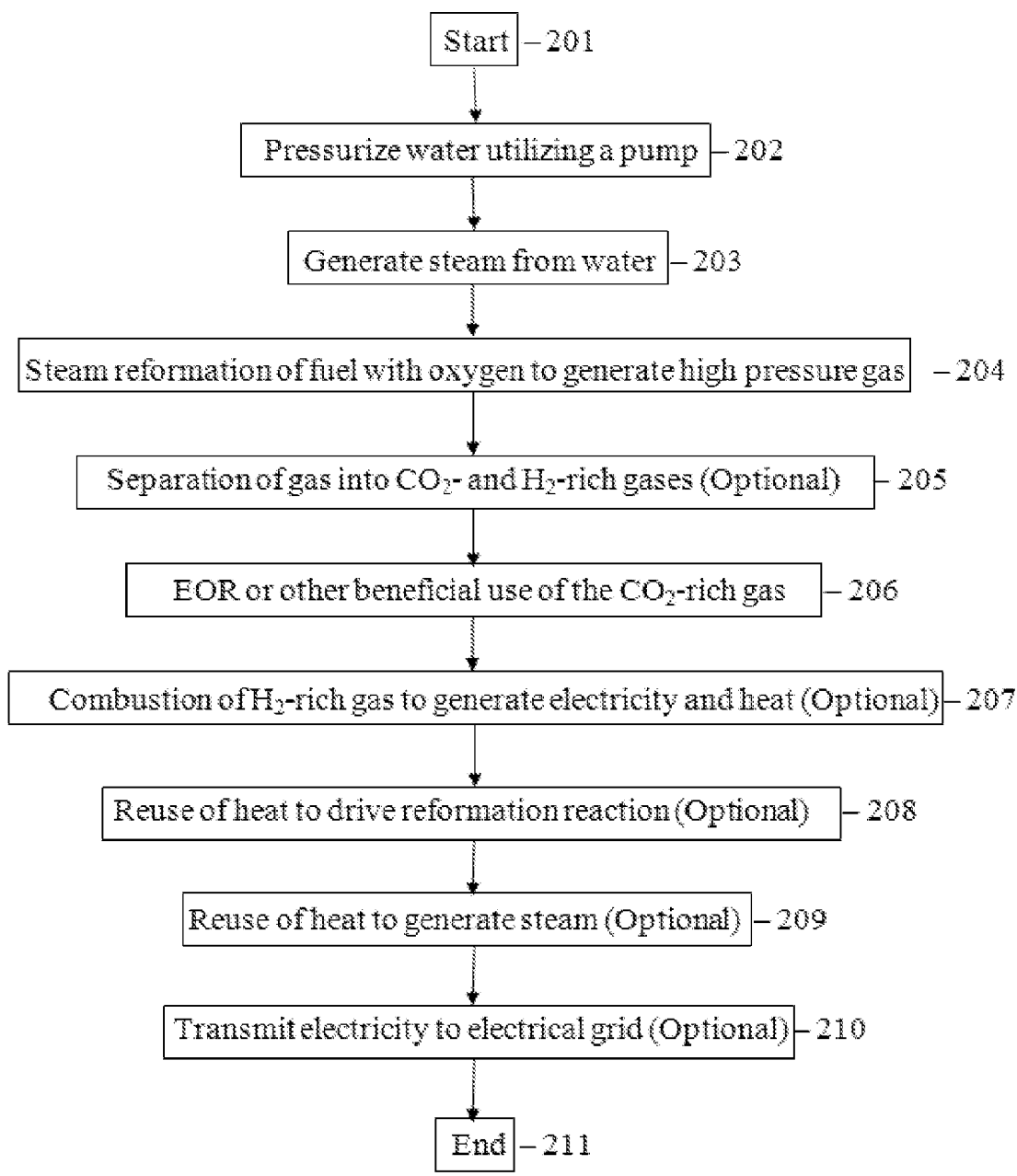
FIG. 2 illustrates an example of operations for reforming super-heated steam and carbonaceous material to create a gas mixture rich in hydrogen and carbon dioxide in which the hydrogen combusts in a gas turbine for electricity generation while the carbon dioxide gas is used for EOR.

FIG. 2 illustrates an example of operations 200 that may be performed in order to generate electricity and $CO_2$ for EOR from carbonaceous material. The process begins at operation 201. At operation 202, a pump pressurizes water. At operation 203, steam is generated from the pressurized water, for example, using a boiler. At operation 204, the carbonaceous material is reformed using steam and oxygen into high pressure gas. At operation 205, a separator separates the high pressure gas into $CO_2$ and $H_2$ rich gases. At operation 206, the carbon dioxide is used for enhanced oil recovery and/or used for other beneficial purposes. The rest of the driver gas, which may include hydrogen gas, as well as minor amounts of methane, carbon monoxide, as well as other gases, are combusted in order to generate electricity and heat, as shown in operation 207. In one example, operation 207 may include combustion of hydrogen and small amounts of methane, in order to provide energy, for instance, within a gas turbine, an internal combustion engine, or a fuel cell. At operation 208, heat passes through a heat exchanger to help drive the reformation reaction. The energy generated from the combustion may be used to heat the feedstock to a temperature where the carbonaceous material reacts with water to form a hydrogen and carbon dioxide-rich high pressure gas, as described in operation 204. Note that the energy used to drive the reforming reaction, and to boil water and produce superheated steam, can also be provided from burning a fuel other than hydrogen, or biomass, or from a non-combustible source, for example, solar energy, nuclear energy, wind energy, grid electricity, or hydroelectric power (not shown in FIG. 2). At operation 209, heat from the exiting high pressure gas exchanges heat with the boiler. Some of the heat from the combustion reaction is used to help generate steam in the boiler, as shown in operation 209. Finally, the electricity may be used locally or transmitted to the local grid, as shown in operation 210. The process 200 ends in step 211. Optionally, pure oxygen may be pre-mixed with the steam to increase reforming yield.

Embodiments of the present invention provide various reformer apparatus subsystems for generating high-pressure gas. In some embodiments, the apparatus utilizes a biomass reforming reaction to generate the high pressure gas and a hydrogen combustion reaction to provide the energy required to reform biomass and generate the high-pressure gas. In addition, the apparatus typically includes heat exchange elements to facilitate heat transfer from the high temperature gas to incoming reformer and/or combustion fuel. The transfer of heat facilitates the reforming reaction and lowers the energy required to complete the driver gas formation. An illustrative embodiment is described in relation to FIG. 3 for separate reformer and combustion reactions, followed by an embodiment described in relation to FIG. 4 for autothermal reforming and production of high-pressure gas by a single reaction chamber.

Indirect Reformer Subsystem

Figure 3:
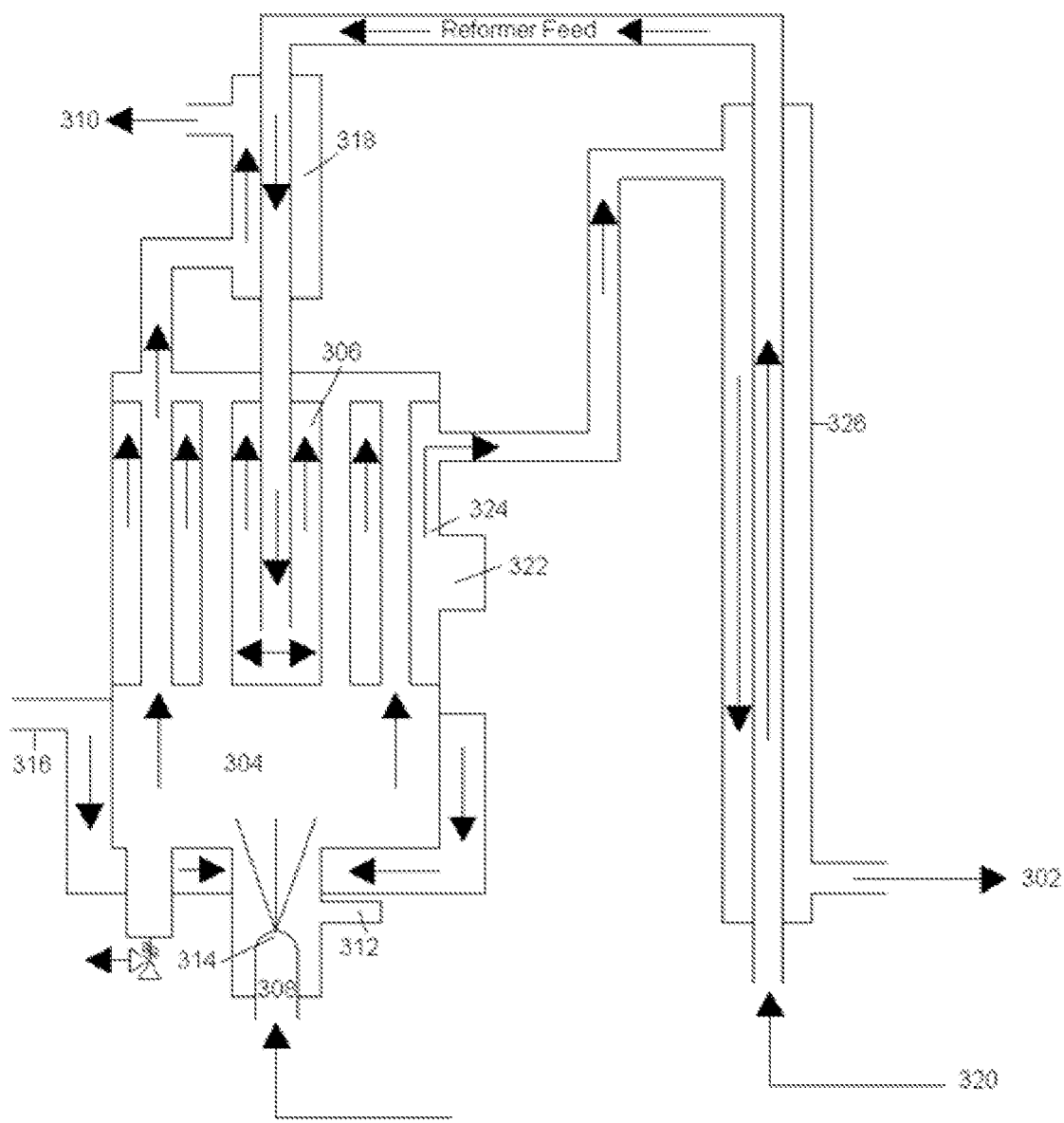
FIG. 3 illustrates an example of an indirect fuel reformer for use with a power plant of the present invention, in accordance with a one embodiment of the present invention.

FIG. 3 illustrates an example of a steam reforming apparatus 300 for generating high pressure gas (shown as arrow 302), in accordance with one embodiment of the present invention.

In FIG. 3, an embodiment of the reforming subsystem may include a first storage container (not shown) for storing a combustible material, such as coal, biomass, an alcohol, olefin, or other like material. A second storage container (not shown) may also be provided for storing the carbonaceous fuel for the reforming reaction. The water may be mixed with the carbonaceous fuel in this container to form slurry. Alternatively, a third container (not shown) may be used to store water to be reacted with the feedstock in the reformer chamber.

In one example, a first chamber 304 has an inlet port 316 and an outlet port 310 and is adapted to provide for the combustion of the combustible material. In one example, the first chamber 304 includes an igniter such as a spark plug 312 or other conventional igniter, and a nozzle 314 coupled with the inlet port 316 of the first chamber 304. The inlet port 316 of the first chamber 304 may be coupled with the first storage container (not shown) so that the contents of the first storage container may be introduced into and combusted within the first chamber 304. The first chamber 304 also includes a port 308 for introducing combustion air, or pure oxygen, into the first chamber 304. The first chamber 304 is also adapted to receive a portion of the second chamber 306, described below, so that the energy/heat from the combustion of the combustible material from the first storage container (not shown) within the first chamber 304 is transferred into a portion of the second chamber 306. The outlet port 310 of the first chamber 304, in one example, is near the inlet port 320 of the second chamber 306, and a heat exchanger 318 is used to allow the combustion exhaust gas to heat the carbonaceous fuel and water entering the second chamber 306. Alternatively, the outlet 310 of the first chamber 306 can feed to a heat exchanger located inside the second chamber 306, which thereby allows the combustion exhaust gases produced in the first chamber 304 to provide the heat to drive the reforming reactions in the second chamber 306.

The second chamber 306 has an inlet port (shown as arrow 320) and an outlet port 302. In one example, the inlet port 320 is coupled with the second and third storage containers (not shown) and receives the contents of the second and third storage containers (not shown).

In one example, the second chamber 306 is positioned within the first chamber 304, such that the combustion heat/energy from the first chamber 304 heats the carbonaceous fuel and water sources contained within the second chamber 306 to a point where the carbonaceous fuel reforms into a high-pressure gas which exists out of the outlet port 302 of the second chamber 306. The first and second chambers may be fluidly isolated.

In one embodiment, shown in FIG. 3, the reformer feed entering the inlet port 320 may be a single fluid, for example carbonaceous fuel-water-oxygen slurry. In other embodiments, not shown in FIG. 3, the carbonaceous fuel and water-oxygen mixture may be fed into the reformer chamber through separate inlets.

In one example, a first heat exchanger 318 is coupled with the outlet port 310 of the first chamber 304 (the combustion chamber) and is thermodynamically coupled with a portion of the inlet port of the second chamber 306. In this manner, the hot combustion exhaust gases from the first chamber are used to preheat the carbonaceous fuel and water sources as they are being introduced into the second chamber 306 for reformation into a high-pressure gas.

A second heat exchanger 326 may also be utilized, wherein the second heat exchanger 326 is thermodynamically coupled with the outlet port 302 and the inlet port 320 of the second chamber 306, which provides the dual benefit of preheating the carbonaceous fuel and water sources prior to entry into the second chamber 306, as well as cooling the driver gas which is expelled from the outlet port 302 of the second chamber 306.

Notwithstanding the above examples, the present invention does not require the use of heat exchangers. The use of heat exchangers is optional. Heat exchangers may be used to increase the efficiency of the reformer subsystem. However, there may be situations in which heat exchangers would not be used, such as when hot gas is desired and/or when the carbonaceous fuel and water sources are pre-heated by other means.

Autothermal Reformer Subsystem

Figure 4:
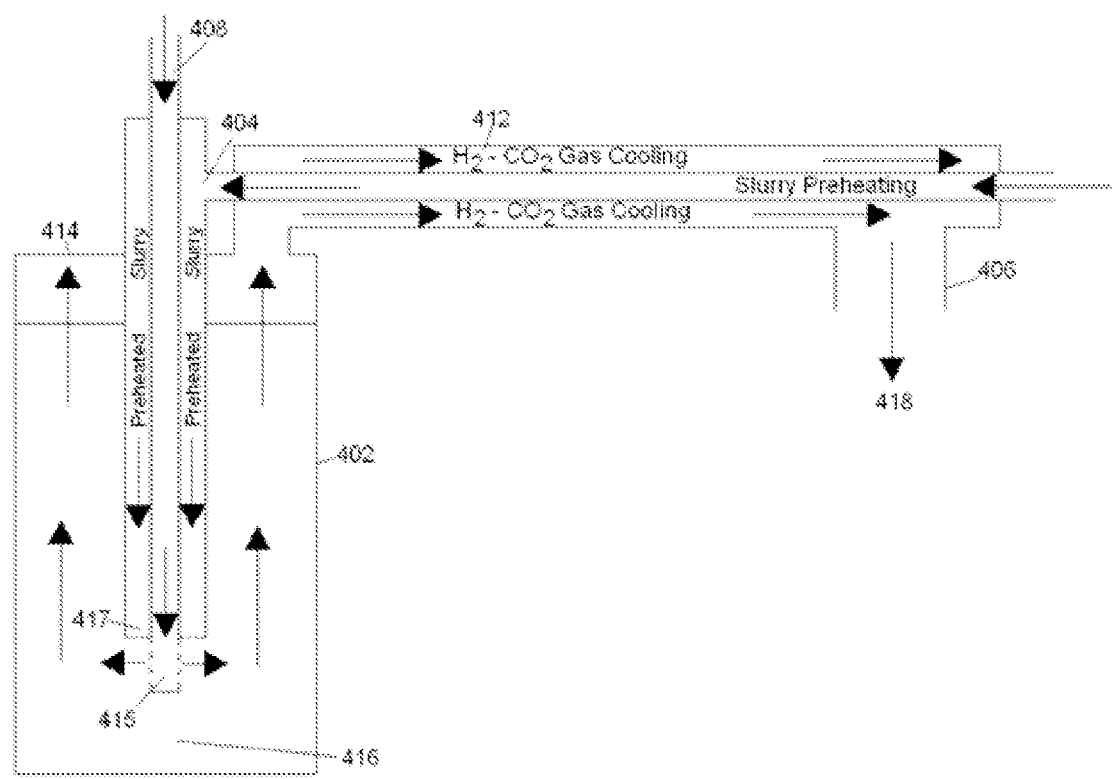
FIG. 4 illustrates an example of an autothermal fuel reformer in accordance with an alternative embodiment of the present invention.

FIG. 4 illustrates another example of a steam reforming subsystem 400 for generating high-pressure gas in accordance with another embodiment of the present invention. The embodiment illustrated in FIG. 4 provides an "autothermal reformer" for the production of high-pressure gas. An autothermal reformer 400 of the present invention directly reacts a carbonaceous fuel source with water as well as oxygen, air, or other oxidizers in a single chamber 402. Embodiments of the reformer provide an environment for reforming carbonaceous fuel from a feed at proper temperature and pressure resulting in the release of high-pressure gas.

Referring to FIG. 4, an autothermal reformer apparatus 400 is shown having a reaction chamber 402, a carbonaceous fuel-water slurry delivery pipe (fuel pipe) 404 for delivery of a mixture of carbonaceous fuel and water, a driver gas outlet port (outlet port) 406 for release of produced high-pressure gas 418, and an oxygen or other oxidizing gas inlet pipe (gas pipe) 408 for delivery of an oxidizing gas used in the combustion of the carbonaceous fuel in the reaction chamber. The oxidizer may also be pre-mixed with the fuel-water slurry or pre-mixed with steam.

Still referring to FIG. 4, the reaction chamber 402 is of sufficient size and shape for autothermal reforming of carbonaceous fuel. Different chamber geometries can be used. In the embodiment shown in FIG. 4, the fuel pipe 404 is coupled to the outlet port 406 to form a counter-current heat exchanger 412 so that the energy/heat from the exiting driver gas is transferred to the carbonaceous fuel-water slurry entering the reaction chamber 402 via the fuel pipe 404. In addition, the fuel pipe 404 typically enters at a first or top end 414 of the reaction chamber 402 and releases the fuel toward the second or bottom end 416 of the reaction chamber 402. This configuration enhances heat released from the heated carbonaceous fuel-water slurry into the contents of the reaction chamber 402. Release of fuel into the reaction chamber 402 can be via an outlet 417 or other like device. The gas pipe 408 is typically coupled to or adjacent to the fuel pipe 404 and releases the oxygen or other oxidizing gas adjacent to the release of the carbonaceous fuel-water slurry 415. When in use, the reaction chamber of the autothermal reformer apparatus is typically preheated to a temperature sufficient to start the reforming reaction, i.e., approximately 500° C., and preferably above approximately 800° C. Preheating may be accomplished by a reaction chamber integrated heating element, a heating coil, an external combustor heating system, an internal combustion system, or other like device (not shown).

The carbonaceous fuel and water sources are fed into the reaction chamber 402 via the fuel pipe 404. At approximately the same time that the carbonaceous fuel-water slurry is being delivered to the reaction chamber 402, the oxygen or other oxidizing agent is being delivered to the reaction chamber via the inlet pipe 408. Various reformer chemical reactions are described below. Once the reforming reaction has been established within the reaction chamber 402, the reaction-chamber heating element may be shut off to conserve energy. Note also that the amount of water combined into the carbonaceous fuel slurry can be adjusted to control the reforming temperatures.

While the example shown in FIG. 4 depicts carbonaceous fuel and water being fed into the reactor together in the form of carbonaceous fuel-water slurry, this is illustrative of only one embodiment. In other embodiments, shown in FIG. 5 and FIG. 6, carbonaceous fuel and water may be fed into the reaction chamber through separate inlets. Also, in other embodiments, not shown, additional combustible material, such as natural gas, oil, charcoal, or any other fuel may be fed into the reaction chamber (in addition to the carbonaceous fuel) in order to facilitate initial system start-up or reactor temperature maintenance. The use of such additional fuel(s) may also be used to provide additional reforming reaction material or to change the hydrogen/carbon dioxide output ratio of the system. All such embodiments are envisioned to be within the scope of the present invention.

Variety of Carbonaceous Fuels

Embodiments of the present invention provide processes for producing high-pressure gas from the reforming of carbonaceous fuel or derivatives of carbonaceous fuel (as described above). Examples of fuel sources that may be used in the reforming reaction include, but are not limited to, biomass, coal, urban and municipal trash, forestry residue, methanol, ethanol, propane, propylene, toluene, octane, diesel, gasoline, crude oil, and natural gas, and in general any carbonaceous (or carbon-containing) compound, such as human or animal waste, plastic waste (for example, used tires). A similar subsystem apparatus may be used to reform these fuels.

The present invention provides reforming processes of carbonaceous fuel or carbonaceous fuel-derivatives to generate, for example, $H_2$, $CO_2$, and other gases. The fuel reforming reactions of the present invention are endothermic, requiring an input of energy to drive the reaction toward fuel reformation.

In one embodiment, the energy required to drive the carbonaceous fuel reforming reaction is provided through the combustion of any combustible material, for example, hydrogen, an alcohol, a refined petroleum product, crude petroleum, natural gas, or coal that provides the necessary heat to drive the endothermic steam reforming reaction.

In other embodiments, the energy required to drive the reforming reaction is provided via any non-combustible source sufficient to generate enough heat to drive the reforming reaction to substantial completion. Examples of non-combustible sources include solar, nuclear, wind, grid electricity, or hydroelectric power.

In a preferred embodiment, shown in FIG. 1A, a portion of the hydrogen gas generated by the reformer is used in the combustion chamber (furnace) to provide heat for the steam reformer.

Reactions 1-4 above provided illustrative processes for reforming carbonaceous fuel to produce high-pressure gas.

Various fuels, such as biomass, coal, alcohols, petroleum, natural gas, etc. may be used as the fuel source for the reforming reaction. Reactions 5-11 illustrate several other reforming reactions using alternative fuel sources that are in accordance with the present invention. The following reactions illustrate a separation of the reforming and combustion reactions; however, as shown in FIG. 4, an autothermal reforming reaction may be accomplished by directly reacting the carbonaceous fuel with oxygen in a single reaction chamber.

$$\text{Coal: } C+2H_2O \rightarrow CO_2+2H_2 \tag{5}$$

$$\text{Methane: } CH_4+2H_2O \rightarrow CO_2+4H_2 \tag{6}$$

$$\text{Ethanol: } C_2H_5OH+3H_2O \rightarrow 2CO_2+6H_2 \tag{7}$$

$$\text{Propane: } C_3H_8+6H_2O \rightarrow 3CO_2+10H_2 \tag{8}$$

$$\text{Propylene: } C_3H_6+6H_2O \rightarrow 3CO_2+9H_2 \tag{9}$$

$$\text{Toluene: } C_7H_8+14H_2O \rightarrow 7CO_2+18H_2 \tag{10}$$

$$\text{Octane: } C_8H_{18}+16H_2O \rightarrow 8CO_2+25H_2 \tag{11}$$

In alternative embodiments, olefins, paraffins, aromatics (as found in crude petroleum), or crude petroleum itself may be used as the reforming reaction fuel source.

Fuel Reformer Subsystem Design Options

The present invention provides for at least three possible carbonaceous fuel-steam reformers, but is not limited to the three carbonaceous fuel reformers described here. These include the fixed-bed reformer (FIG. 5), the fluidized-bed reformer (FIG. 6), and the entrained-flow reformer (not illustrated). The carbonaceous fuel reformers increase in complexity in the order listed. The solids-residue handling requirements also increase in complexity in the same order. However, reaction rates also increase in the same order, leading to reduced equipment sizes for a given throughput. Each carbonaceous fuel-steam reformer may be implemented as an indirect reformer configuration (as shown in FIG. 3), or as an autothermal reformer configuration (as shown in FIG. 4).

Table 1 shows important features that distinguish the three possible carbonaceous fuel-steam reformers. Values are shown to illustrate relative differences in the reformer parameters.

TABLE 1

Operating parameters of various carbonaceous fuel-steam reformers

| Operating Parameter | Fixed-Bed Reformer (FIG. 5) | Fluidized-Bed Reformer (FIG. 6) | Entrained-Flow Reformer (not illustrated) |
|---|---|---|---|
| Feed Particle Size | approx. <1" | approx. <¼" | approx. <0.1" |
| Temperature | approx. >700° C. | approx. >800° C. | approx. >1,200° C. |
| Solids Retention Time | greatest | intermediate | shortest |
| Gas Retention Time | longest | shorter | shortest |

All three carbonaceous fuel-steam reformers operate at sufficient temperature to eliminate catalyst requirements for steam reforming. The fixed-bed and fluidized-bed reformers are able to accept carbonaceous fuel of the delivered particle size. The entrained-flow reformer would require additional grinding or pulverizing of the carbonaceous fuel after delivery.

Figure 5:
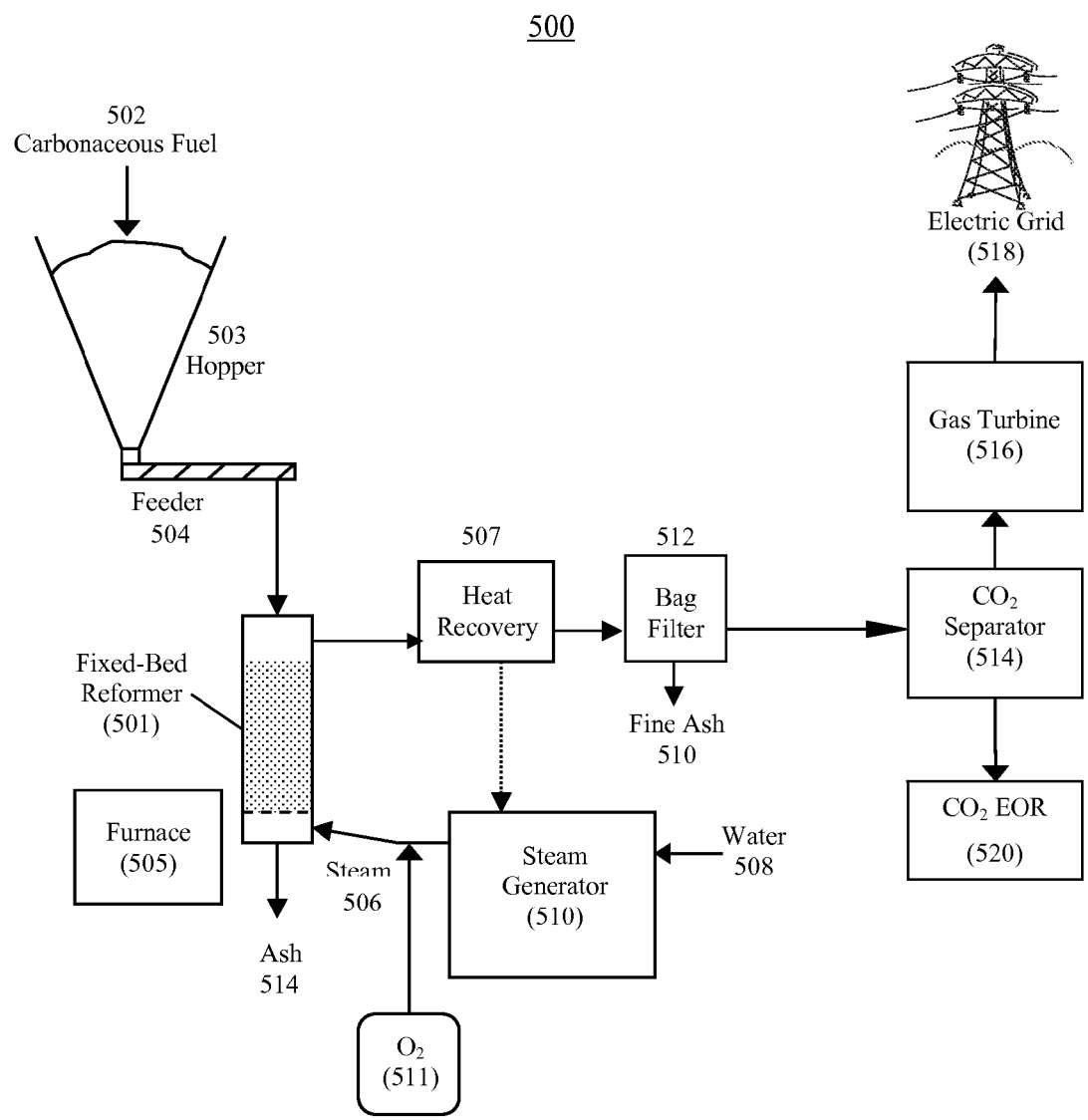
FIG. 5 illustrates an example of a fixed-bed steam reformer for use with a power plant of the present invention in accordance with one embodiment of the present invention.

In one embodiment of the present invention 500, depicted in FIG. 5, a fixed-bed fuel-steam reformer 501 is used to generate high-pressure driver gas. In the reaction chamber of the fixed-bed reformer, nearly all the feed and residue particles remain in reaction chamber 501 during reforming. Delivered carbonaceous fuel 502 with a feed particle size of approximately less than 1-inch is introduced into hopper 503. The carbonaceous fuel 502 is then fed into fixed-bed reformer 501 through feeder 504. Steam (shown as arrow 506) is also fed into the fixed-bed reformer 501. In one embodiment, heat recovered from the reformer gas is directed into heat recovery unit 507. The heat can be sent to steam generator 510 to convert water (shown as arrow 508) into steam (shown as arrow 506). Furnace 505, which may be fueled by hydrogen and/or carbonaceous material, provides the necessary heat to drive the reformer 501. In one embodiment, oxygen 511 may be introduced into the fixed-bed reformer 501, either through a separate inlet, or pre-mixed with the steam 506 as shown in FIG. 5, in order to increase the reforming volumes using an autothermal reaction.

The fixed-bed reformer can be fed and discharged in batch mode, semi-batch mode (incremental feeding and discharging of ash), or continuous mode. In the fixed-bed reformer, the coarse ash 514 remaining after steam reforming is largely handled in the form of coarser particles that can be removed from the bottom of the reactor. Coarse ash 514 can be considered a byproduct in the system with a clast size greater than 0.063 millimeters. Smaller remaining amounts of ash are entrained in the low velocity exhaust gas exiting the reformer. This fine ash 510 of clast size less than 0.063 millimeters is removed through bag filter 512. The filtered, high-pressure driver gas is then sent to gas separator 514, which separates the high pressure driver gas into a fraction rich in $CO_2$ gas, and a fraction rich in $H_2$ (fuel gas). The $CO_2$-rich gas may then be easily used for EOR 520, since it is high-pressure, high-purity $CO_2$. The $H_2$-rich fuel gas, which may also contain minor amounts of methane and carbon monoxide, may then be fed to gas turbine 516, where it is combusted with air to provide electricity to the electric grid 518, or used on-site at for oil field operations. Since the $H_2$-rich fuel gas combusts with little or no associated $CO_2$ emissions into the atmosphere, the electricity generated by gas turbine 516 may be considered to be "carbon-free" electricity.

Figure 6:
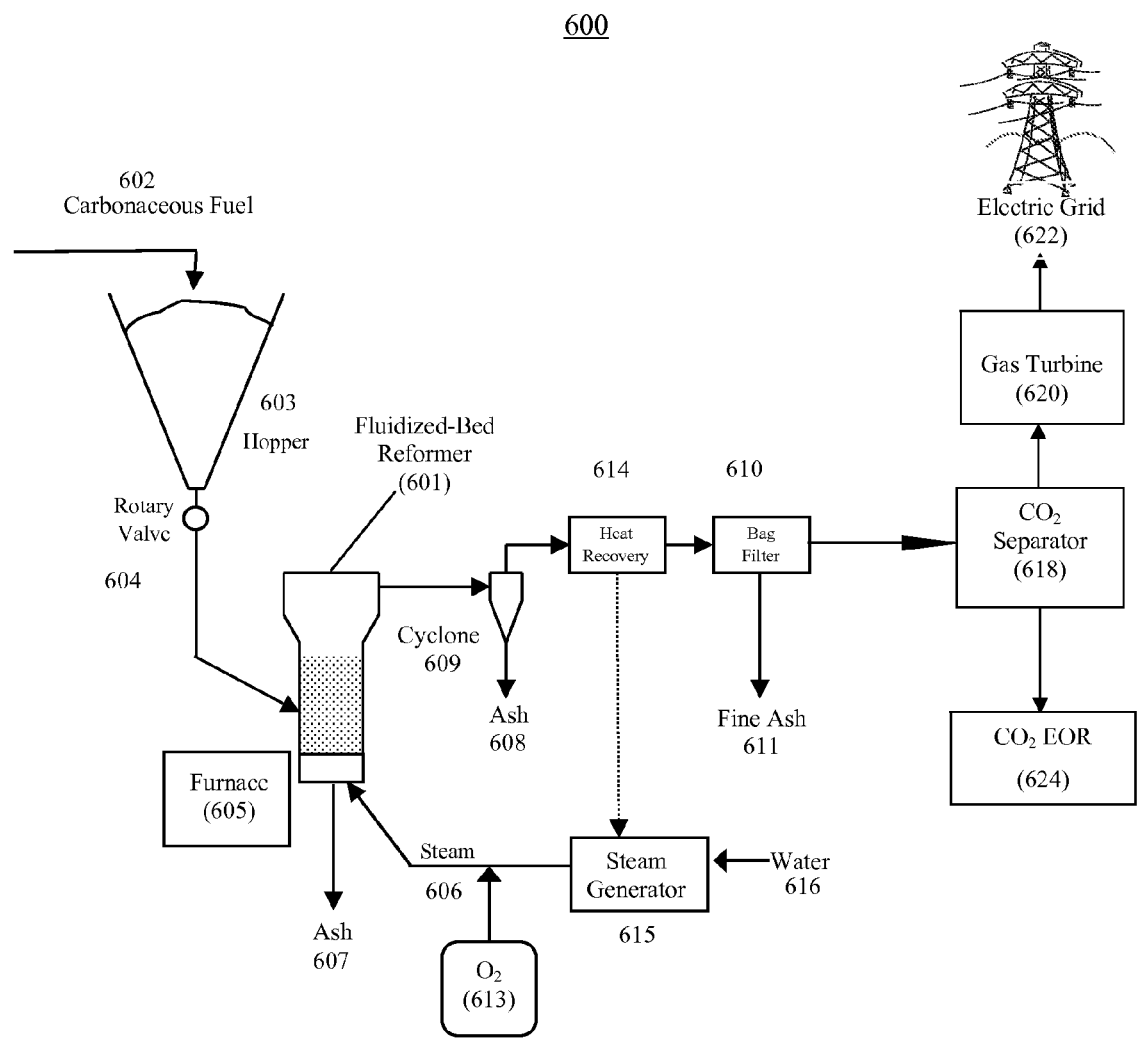
FIG. 6 illustrates an example of a fluidized-bed steam reformer for use with a power plant of the present invention in accordance with an alternative embodiment of the present invention.

In an alternative embodiment 600, depicted in FIG. 6, a fluidized-bed reformer 601 is used to generate high pressure gas. In the fluidized-bed reformer 601, most particles remain in the reaction chamber, but finer particles are entrained with the exhaust gas. That is, compared to the fixed-bed reformer 501 of FIG. 5, greater amounts of fine particles are entrained in the higher velocity exhaust gas (relative to the exhaust gas generated in the fixed-bed reformer) and must be removed prior to compression of the driver gas. The coarsest of the entrained particles are removed from the gas stream and can be recycled to the reformer or discharged as residue. The remaining finest particles are removed by filtration.

FIG. 6 illustrates an example of an embodiment of a system utilizing the fluidized-bed reformer 601. Delivered carbonaceous fuel 602 with a feed particle size of approximately less than ¼-inch is introduced into hopper 603. The carbonaceous fuel is fed into fluidized-bed reformer 601 upon opening of the rotary valve 604. In the fluidized-bed reformer 601, steam (shown as arrow 606) is also fed into the reaction chamber. Furnace 605, which may be fueled by hydrogen and/or carbonaceous fuel, provides the necessary heat to drive the reformer 601. In one embodiment, oxygen 613 may be introduced into the fluidized-bed reformer 601, either through a separate inlet, or pre-mixed with the steam 606 as shown in FIG. 6, in order to increase the reforming volumes using an autothermal reaction.

It is noted that in the fluidized-bed reformer 601, continuous feeding with semi-continuous discharge of coarser ash 607 is preferable. Intermediate ash 608 in exhaust gas exiting the fluidized-bed reformer 601 is removed by cyclone separator 609 (to remove intermediate-sized particles) and bag filter 610 (to remove the finest particles of ash 611). The intermediate-sized particles separated by cyclone 609 can be recycled to the fluidized-bed reformer 601 or removed as residue, depending on the extent of their conversion during reforming. In one embodiment of the fluidized-bed reformer 601, exhaust gas existing cyclone 609 enters heat recovery unit 614. The heat can be sent to steam generator 615 to convert water (shown as arrow 616) into steam (shown as arrow 606). The $CO_2$ separator 618 separates the high pressure driver gas into a $CO_2$-rich gas and a $H_2$-rich fuel gas. The $CO_2$-rich gas may be directed for EOR 624. The $H_2$-rich fuel gas may be provided to a gas turbine 620. The gas turbine 620 combusts the $H_2$-rich fuel gas with air to generate electricity, using for example a generator (not shown); and the electricity may then be fed to the electrical grid 622. Since the $H_2$-rich fuel gas combusts with little or no associated $CO_2$ emissions into the atmosphere, the electricity generated by gas turbine 620 may be considered to be "carbon-free" electricity.

In another embodiment of the present invention (not illustrated), an entrained-flow reformer is used rather than a fixed-bed or fluidized-bed reformer. In an entrained-flow reformer, virtually all particles are removed with the exhaust gas steam exiting the reformer. The feed particle size using the entrained-flow reformer is generally less than approximately 0.1 inch. Compared to the fixed-bed and fluidized-bed reformers, the entrained-flow reformer would require additional grinding or pulverizing of the carbonaceous fuel after delivery. Furthermore, with the entrained-flow reformer, the entire feed stream is entrained and removed from the reaction chamber at high velocity. Cyclone and filtration hardware similar to those of the fluidized-bed reformer are used, but removal capacities must be greater.

In other embodiments of the present invention, (not illustrated in FIG. 5 or FIG. 6), carbonaceous fuel-water slurry may be used to provide both carbonaceous fuel and water into the reformer in liquid form via a single feed system, as shown in FIG. 3 and FIG. 4.

The reformers may operate at sufficient temperature to eliminate catalyst requirements for steam reforming Generally, the fixed-bed reformer may operate at temperatures above approximately 700° C., while the fluidized-bed reformer may operate at temperatures above approximately 800° C. The entrained-flow reformer may operate at temperatures in excess of approximately 1,200° C. These temperature ranges are illustrative only, and are not intended to limit the scope of the present invention. All carbonaceous fuel-steam reformers may operate over temperature ranges other than those temperature ranges disclosed here.

The fixed-bed reformer 501 of FIG. 5 and fluidized bed reformer 601 of FIG. 6 may be designed as illustrated in FIG. 3 or FIG. 4. That is, the steam reforming of carbonaceous fuel can be carried out using an indirect reformer, as in FIG. 3, or a direct ("autothermal") reformer, as depicted in FIG. 4. Indirect reforming requires heat exchange between the heat source ($H_2$ fuel combustion, for example) and the reformer. High pressure gas produced from indirect steam reforming results in greater hydrogen:carbon dioxide ratio than gas produced from direct ("autothermal") reforming. It will be appreciated that the combustible material may be hydrogen ($H_2$), or alternatively may be an alcohol, olefin, natural gas, oil, coal, biomass or other combustible source.

Autothermal reforming eliminates the heat exchange requirement since partial combustion is performed in the reforming reaction chamber to generate heat. Using oxygen for the oxidizer, the autothermal reformer product gas is still a mixture of carbon dioxide and hydrogen, but the hydrogen: carbon dioxide ratio is lower than that for indirect reforming. Using air as the oxidizer, the autothermal reformer product gas is diluted with nitrogen, which may be undesirable in cases where high purity $CO_2$ is required.

Illustrative carbonaceous fuel reformers have been described and shown here. However, the present invention is not limited to these carbonaceous fuel reformer configurations, and other carbonaceous fuel reformers are within the scope of the present invention.

Sulfur Removal

Most carbonaceous fuel has some sulfur. Because steam reforming may be performed without catalyst, reforming catalyst poisoning by sulfur compounds is not an issue. In cases where a low-sulfur carbonaceous fuel is used, sulfur clean up of the exhaust gas may not be required at all. In the event of potential issues with corrosion caused by sulfur-containing gases in combination with any residual moisture, several sulfur treatment and removal methods are possible.

Dry sorbents may be used to capture sulfur in the exhaust gas. Calcium oxide, magnesium oxide, and sodium carbonate are example dry sorbents that are capable of trapping sulfur gases in solid form (as sulfates or sulfites, depending on the relative oxidation conditions). When the operating temperature and pressure permit effective sulfur capture, sorbent can be added in a coarse form with the feedstock to fixed- or fluidized-bed reformer configurations. The resulting sulfur-containing product can then be removed from the reaction chamber with the ash remaining after reforming. Alternatively, a finer sorbent can be injected into the gas downstream of the reactor. Sulfur containing solids can then be collected in the cyclone or bag filter. For the entrained-flow reformer configuration, a sorbent will likely perform better by injection into partially cooled gas downstream of the reformer.

In large-capacity reformer configurations, a dry sorbent may be injected in a separate unit downstream of the final ash particulate filter. The sulfur product can then be collected separately in another filter and can potentially be sold as a product for additional revenue.

In other embodiments, sulfur may also be removed by using a wet scrubber sub-system. Wet scrubbers can be configured in venturi, packed-column, or tray-type systems in which the cooled gases are contacted with a scrubbing solution or slurry. The resulting scrubber solution or slurry must then be disposed.

The use of the methanol $CO_2$ separation system described below has the additional benefit of removing sulfur impurities from the $CO_2$ gas stream.

Preferred $CO_2$ Separation Subsystem

According to the present invention, highly economic $CO_2$ and $H_2$ generation system is disclosed. The $CO_2$ and $H_2$ are generated from any carbonaceous fuel source including biomass, coal, or natural, highly economical fuel sources and ones that are available almost anywhere. The $CO_2$ generated in the present invention may be injected into an oil well for enhanced oil recovery or used for other beneficial purposes. The present invention also generates large supplies of hydrogen, which may be split off from the $CO_2$ product to be used for many purposes, including electrical power generation or petrochemical hydrogenation.

In an alternative embodiment, the hydrogen gas may be sold to the petrochemical or other industry. In the future, it may also be sold as fuel for hydrogen-electric vehicles. Alternatively, the hydrogen may be burned to generate electricity, using a gas turbine, an internal combustion engine, a fuel cell, or the like. The electricity may be sold to utility companies by feeding the electricity into the electric grid or used locally for oil field operations.

Carbon dioxide is approximately two orders of magnitude more soluble in methanol than any of methane, hydrogen, nitrogen, oxygen, or carbon monoxide (which all have solubilities of the same order). The methanol also acts as a trap, removing sulfur impurities from the gas stream. In experiments done to date, the inventors have shown that at 10 bar pressure and 10° C., methanol will take into solution about 40 grams per liter of $CO_2$ from a 40% $CO_2$/60% $N_2$ gas mixture, with less than 2 grams/liter of $N_2$ entrained.

The inventors have used this data to create a system where liquid methanol is pumped in a cycle from 1 bar to 10 bar, with the gas mix being bubbled through a column on the 10 bar side, and captured gas allowed to outgas from solution on the 1 bar side. Results to date show that product gas purities of 95% $CO_2$ can be obtained, with 80% of the input $CO_2$ in the feed gas stream being captured into the product stream. The fraction captured could be increased further to better than 95% by heating the methanol in the low pressure tank to 40° C., which could be readily done using low-quality waste heat from either the steam reformer or power generation systems. Warming the methanol in this manner would increase the methanol vapor pressure in the exhaust to about 0.3 bar, but nearly all of the entrained methanol vapor could be condensed and removed by running a low-cost −18° C. refrigerator downstream of the exhaust vessel. This unit would also reduce the $CO_2$ temperature to −18° C., which is advantageous, as it allows $CO_2$ gas to be liquefied by subsequent compression to only 20 bar.

However, in order to eliminate the large majority of this compression energy work, reduce methanol recirculation pump work by an order of magnitude, and to obtain both $CO_2$ product recoveries and purities of better than 97%, a preferred system configuration may be used that uses methanol cooled to −60° C. in the absorption column. Such a column can acquire $CO_2$ in the liquid phase, forming mixtures that are more than 30% $CO_2$ by weight, with only insignificant qualities of non-$CO_2$ gases brought into solution. Upon being warmed in the desorption column to 40° C., nearly all the $CO_2$ is stripped, and removed from the system at 10 bar, making subsequent liquefaction straightforward. In the preferred embodiment, the heating of the methanol occurs at the bottom of the downflowing desorption column, with cold $CO_2$-saturated methanol on top, so that very little methanol vapor escapes with the product $CO_2$.

In the process of liquefaction, nearly pure $CO_2$ is obtained, as neither hydrogen, methane, oxygen, nitrogen, nor carbon monoxide will be liquefied at −60° C. Once the $CO_2$ is liquefied, it can be brought to whatever high pressure is required for underground injection at little energy cost.

The non-$CO_2$ product gases, which will be a mixture of hydrogen, methane, and small amounts of carbon monoxide, are sent directly to a gas turbine where it is burned to produce electricity.

Alternative $CO_2$ Separation Subsystems

Various alternative techniques may be used to separate hydrogen gas from carbon dioxide gas, in additional to the methanol-$CO_2$ separation technique described above. In one embodiment, hydrogen-carbon dioxide separation may be performed using membranes. The membranes separate molecules based on their relative permeability through various materials that may include polymers, metals, and metal oxides. The membranes are fed at elevated pressure. Permeate is collected at lower pressure while the retentate is collected at a pressure close to the feed pressure.

A membrane separation technique that may operate in conjunction with reactions at elevated temperature is the palladium membrane. This membrane, which may be fabricated using palladium alone or in combination with modifiers, allows only hydrogen to permeate. This type of membrane, when operated in a catalytic reactor, such as in a steam reformer, enhances yield by removing a reaction product from the reaction zone. Some variants are capable of operation at up to 900° C.

Another membrane separation method that may be used is a high-temperature polymer membrane. This type of membrane is directed toward $CO_2$ separation and recovery. A polymeric-metal membrane of this type can operate at up to 370° C. (versus typical polymer membrane maximum temperatures of about 150° C.), thus potentially improving process energy efficiency by eliminating a pre-cooling step.

In yet another embodiment, carbon dioxide may be separated from hydrogen by scrubbing in an amine solution. This technique may be used to remove carbon dioxide (and hydrogen sulfide) from the high-pressure gas.

Finally, in yet another embodiment, regenerable sorbents may be used to separate hydrogen gas from carbon dioxide gas. In one example of a low-cost regenerable sorption method, a sodium carbonate sorbent is used. The sodium carbonate sorbent operates cyclically, by absorbing at about 60° C. and regenerating at about 120° C.

As described in the preferred $CO_2$ separator section, processes that generate high $CO_2$ concentrations are more amenable to affordable gas separation. Elimination of diluents such as nitrogen from air greatly improves $CO_2$ capture efficiency. In addition, processes that produce $CO_2$ at elevated pressure are at an advantage for the pressure-based separation techniques.

Various gas separator modules may be used, and the present invention is not limited to the particular gas separators shown or described herein, so long as the gas separators perform at least the function of separating $CO_2$ from the rest of the driver gas.

System Design Using a Modular Configuration

The present invention may also be configured as a modular system, which may include all or part of the following set of components: a steam reformer, a gas separator, heat exchangers, a power generator, and a control system. These components may be mixed and matched depending on the particular application, and the requirements of a particular user. These components are described in detail throughout this disclosure.

A carbonaceous fuel reformer module is provided that is capable of reacting carbonaceous fuel with water to produce a mixture of $CO_2$ and hydrogen gas, sized to an output rate appropriate for the application. Depending upon the availability and cost of local carbonaceous fuel types, the reformer may be designed to operate with various candidate carbonaceous fuel feed-stocks. The carbonaceous fuel reformer may be designed as a fixed-bed reformer, a fluidized-bed reformer, an entrained-flow reformer, or another design altogether. The carbonaceous fuel reformer may be designed in a direct reforming configuration, or an indirect ("autothermal") reforming configuration. Examples of the design of such carbonaceous fuel reformers are discussed above in relation to FIGS. 3-6.

A set of heat exchangers is provided that are designed to maximize the thermal efficiency of the reformer system. The heat exchangers were discussed above in relation with the fuel reformers of FIGS. 3 and 4.

A gas separator module is provided that is capable of separating the $CO_2$ from the hydrogen gas. Candidate separator systems include methanol temperature and/or pressure swing, sorption beds, $CO_2$ freezers, membranes, and centrifugal separators, as described above.

A power generator module is provided that is capable of utilizing the hydrogen product separated by the gas separator to generate electricity. The power generator may be a gas turbine, an internal combustion engine, a fuel cell system, or any other apparatus or system that can generate power (electrical or mechanical or other) from hydrogen, methane, and/or carbon monoxide gas.

A control module is provided that is capable of controlling the operation of the system both automatically and with user-input. The control module may use subsurface data to automatically regulate the operation of the system via feedback control. This allows the system to operate with minimal human supervision or labor. The subsurface data may include total pressure, partial pressure of carbon dioxide, partial pressure of hydrogen, temperature, and/or viscosity of the oil. The control module may also include a set of controls for user-control of the system.

The control system may be used to control the power plant based on the local prices of electricity, carbonaceous feedstock, water, and the value of the product produced via the beneficial reuse of $CO_2$. That is, if the local price of electricity has increased and/or there is a demand for more power, the control system may divert more of the hydrogen to electricity generation. The opposite condition may hold if the local price of electricity dropped or if the market price of the product produced via the beneficial reuse of $CO_2$ rose; in this case the control system may divert more of the hydrogen gas and $CO_2$ gas for beneficial use. This optimization operation may be performed automatically by a control module based on real-time inputs of market prices and other parameters.

According to another embodiment, the control system may be used to control the power plant based on a temperature, a pressure, and a gas composition of the driver gas in real-time by controlling an input oxygen-to-steam ratio. Such a control system may be implemented using negative feedback control on the injection of oxygen-to-steam ratio into the steam reformer.

A gas capture module is provided that is capable of re-capturing a portion of the $CO_2$ gas and recycling the gas. The gas capture module allows the $CO_2$ that is released with the oil emerging from the ground to be re-captured and sent via the compressor module underground for reuse. The gas capture module increases the overall efficiency of an oil recovery operation, because a portion of the generated $CO_2$ gas is recycled and reused.

In one embodiment, a gas capture module is created by pumping the oil into a vessel with a certain amount of ullage space above the oil, and drawing suction on the ullage with another pump. This operation will lower the vapor pressure of carbon dioxide above the oil, allowing gases in solution to outgas so that they can be recycled back into the well. Various gas capture modules are within the scope of the present invention, and the present invention is not limited to the particular gas capture modules or methods shown or described here, as long as the gas capture modules or methods are capable of capturing at least a portion of the gas emerging with the oil from the oil well.

Power Generation Subsystem

The hydrogen gas separated by the gas separator module may be used to generate power. The power generator module utilizes a portion of the hydrogen gas separated by the gas separator module to generate power. In one embodiment, the power generator module is used to generate electricity. In one embodiment, the electricity is sold to a utility company by feeding the electricity into the electric grid. The power generator module may be a combustion turbine, a steam turbine, a fuel cell, or any other apparatus, system, or module that can generate power (electrical or mechanical or other) from hydrogen gas.

According to one embodiment of the power generator module utilizing a combustion turbine, hydrogen is fed with air to generate power through a rotating shaft. Designs of hydrogen gas turbine plants are described in U.S. Pat. No. 5,755,089 to Vanselow, U.S. Pat. No. 5,687,559 to Sato, and U.S. Pat. No. 5,590,518 to Janes. Designs of hydrogen internal combustion engines are described in U.S. Pat. No. 7,089,907 to Shinagawa et al., U.S. Pat. No. 4,508,064 to Watanabe, and U.S. Pat. No. 3,918,263 to Swingle.

Another embodiment of the power generator module uses a steam turbine. A variety of fuels may be used, including a portion of the separated hydrogen, part of the coal or other feedstock material, or even waste hydrocarbon gases. The fuel is burned in air in a combustion chamber to generate heat. The heat is transferred to a closed-loop steam/water system through a series of heat exchangers designed to recover the combustion heat. The high-pressure steam drives a turbine for power generation. In one embodiment, the combustion turbine and steam turbine may be integrated to boost efficiency (integrated combined cycle).

As an alternative to combustion, in one embodiment of the present invention, a fuel cell module may be used to convert hydrogen directly to electricity, usually with greater efficiency albeit at a higher capital cost. The fuel cell module, an electrochemical energy conversion device, produces electricity from the hydrogen fuel (on the anode side) and oxidant (on the cathode side). The hydrogen and oxidant (which may be ambient oxygen) react in the presence of an electrolyte. The reactants (hydrogen and oxygen) flow in and reaction products (water) flow out, while the electrolyte remains in the cell. The fuel cell can operate virtually continuously as long as the necessary flows of hydrogen and oxidant are maintained. Designs of fuel cell plants are described in U.S. Pat. No. 6,893,755 to Leboe, U.S. Pat. No. 6,653,005 to Muradov, U.S. Pat. No. 6,503,649 to Czajkowski et al., U.S. Pat. No. 6,458,478 to Wang et al., U.S. Pat. No. 5,079,103 to Schramm, U.S. Pat. No. 4,659,634 to Struthers, and U.S. Pat. No. 4,622,275 to Noguchi et al.

Various power generator modules are within the scope of the present invention, and are not limited to the particular power generators shown or described here, so long as the power generators can generate power, whether electrical, mechanical, or other, from hydrogen-rich gas.

Natural Gas Reformer Module

In one embodiment of the present invention, natural gas—either locally produced, stranded, or imported from off-site—may be used as the fuel source for the reforming reaction. This is highly convenient, and under some conditions may be highly advantageous from both a logistical and an economic perspective. Accordingly, in one embodiment of the present invention, a natural gas reformer module is used.

Figure 7:
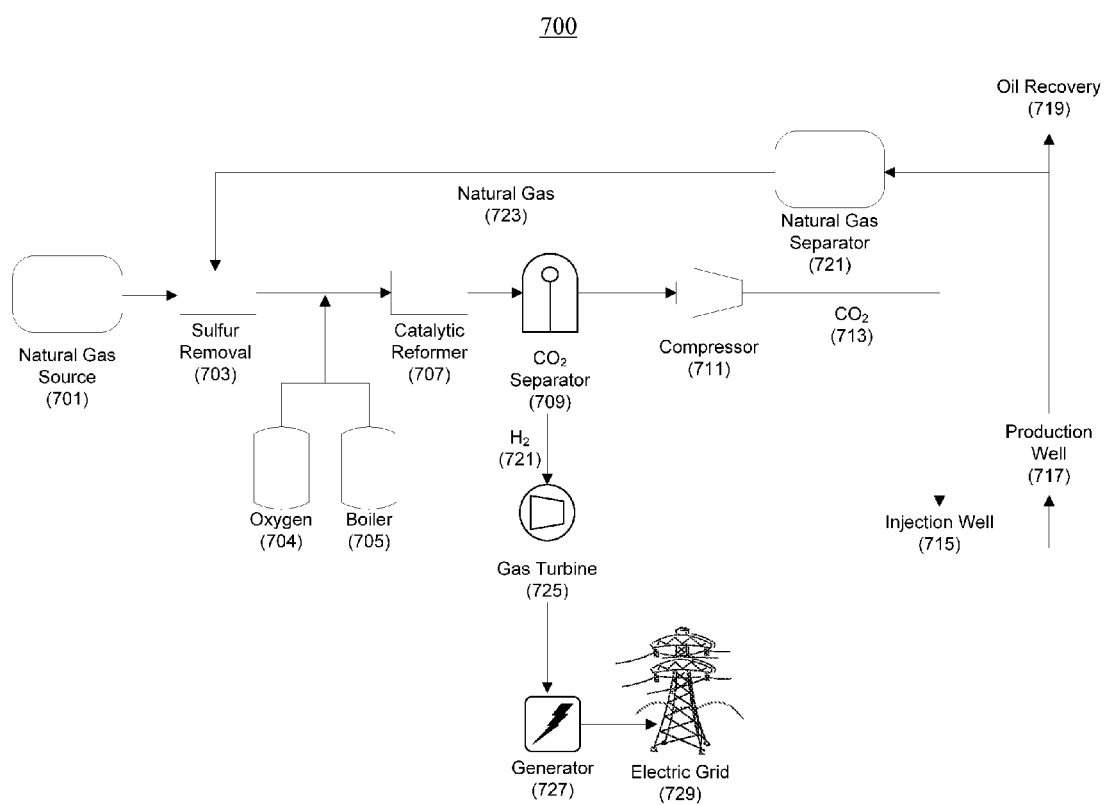
FIG. 7 illustrates an example of a power plant utilizing a natural gas reformer according to yet another embodiment using the principles of the present invention.

FIG. 7 shows a schematic of a system 700 utilizing a catalytic natural gas reformer module 707. Natural gas from a natural gas source 701, either from off-site or on-site, is fed via a line into sulfur removal module 703, if necessary to remove sulfur. Desulfurized natural gas is fed via another line into methane reformer module 707. Steam from boiler 705, and optionally oxygen from oxygen tank 704, is added to methane reformer module 707. The exhaust driver gas exiting the methane reformer module 707 is passed through a set of heat exchangers (not shown). The cooled driver gas is passed to separator module 709, in which it is separated into a portion rich in hydrogen gas 711, and a portion rich in $CO_2$ gas. The $CO_2$-rich gas portion is sent to compressor module 711. The compressor module 711 compresses the $CO_2$-rich driver gas to a pressure appropriate for the oil well. Finally, the high pressure $CO_2$-rich driver gas 713 is injected via an injection line into injection well 715. The oil is recovered using the same injection well 715 ("Huff-and-Puff") or another production well 717. After oil recovery 719, natural gas 723 may be separated from the oil in a natural gas separator 721, and supplied to sulfur removal module 703 to provide fuel for the methane reformer. In short, local, stranded, or off-site natural gas may all be used to provide fuel to drive the methane reformer 707. The hydrogen gas 711 is fed to gas turbine 725, where it generates electricity via generator 727, which may be fed to the electric grid 729 or used on-site. As with the coal reforming modules, heat recovered from the natural gas reformer module may be used to generate electrical or mechanical power to drive the compressor module or other system hardware.

If refined, desulfurized natural gas is used, no gas clean up is required. That is, the sulfur removal module 703 in FIG. 7 is not needed and may be removed. If raw natural gas is used, sulfur must generally be removed before the reformer module 707 to prevent catalyst poisoning. Sulfur contained in natural gas can be removed on catalysts or sorbents such as zinc oxide, activated carbon (with chromium or copper), nickel oxide, or certain molecular sieves (13×). Some of these sorbents work at ambient temperature; others require elevated temperatures. Once captured, the sorbents may be disposed or regenerated. Many of the sorbents release trapped sulfur as hydrogen sulfide gas. If desired, the released hydrogen sulfide can be collected as elemental sulfur using methods such as the Claus process. In the Claus process, a portion of the $H_2S$ is reacted with oxygen to form $SO_2$. The $SO_2$ then reacts with the remaining $H_2S$ to form elemental sulfur and water. The elemental sulfur may be recycled or sold to the petrochemical industry for additional revenue.

Local Oil Reformer Module

In yet another embodiment of the present invention, a portion of the local oil may be used as the fuel source for the reforming reaction. This is highly convenient, and under some conditions may be economical. Local, unrefined oil may be significantly cheaper than oil for the end-consumer because no transportation or processing is required. Accordingly, in one embodiment of the present invention, an oil reformer module is used, in which a portion of the oil extracted from the oil well is used in a closed-loop system as a reforming fuel source.

Figure 8:
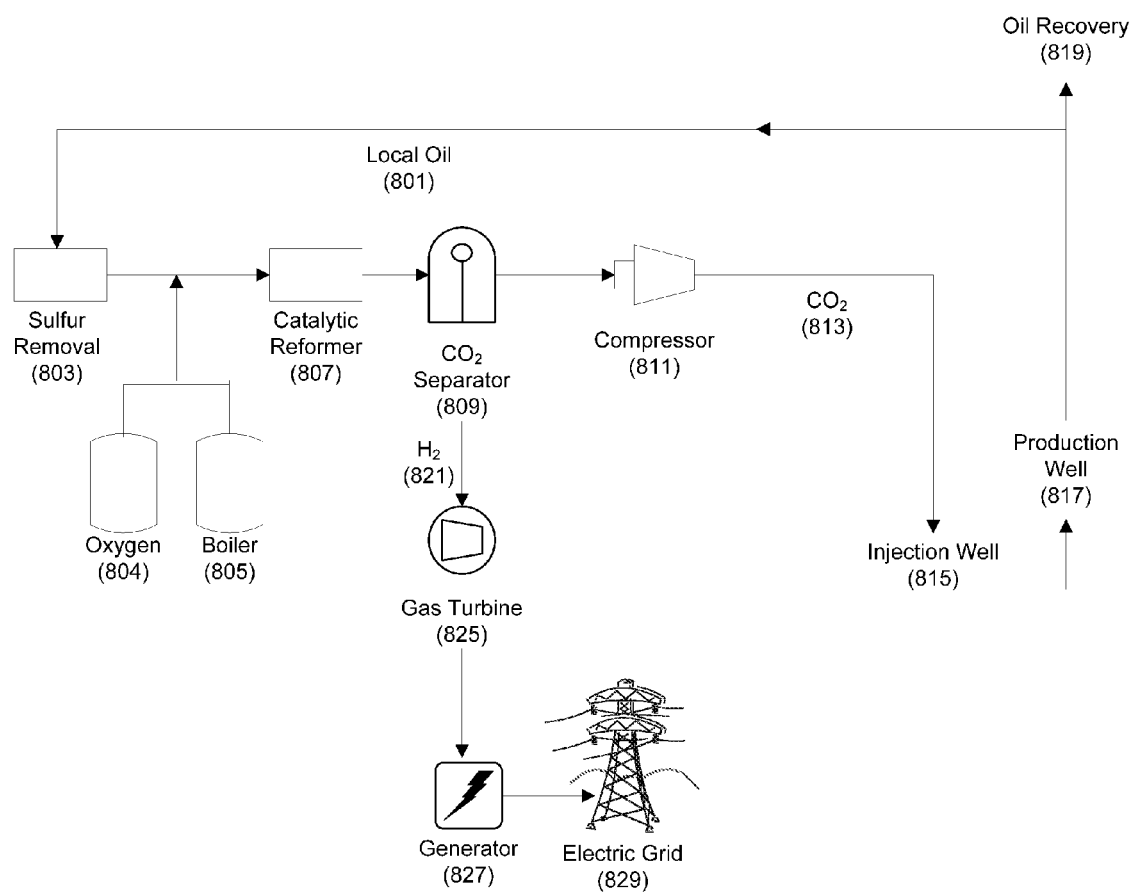
FIG. 8 illustrates an example of a power plant utilizing a local oil reformer according to yet another embodiment using the principles of the present invention.

FIG. 8 shows a schematic of a system 800 utilizing a catalytic oil reformer module 807. A portion of the petroleum 801 recovered from the oil site is fed into sulfur removal module 803. Desulfurized petroleum is fed via another line into catalytic oil reformer module 807. Steam from boiler 805, and optionally oxygen from oxygen tank 804, is added to oil reformer module 807. The exhaust driver gas exiting the oil reformer module 807 is passed through a set of heat exchangers (not shown). The cooled driver gas is passed to separator module 809, in which it is separated into a portion rich in hydrogen gas 811, and a portion rich in $CO_2$ gas. The $CO_2$-rich gas portion is sent to compressor module 811. The compressor module 811 compresses the $CO_2$-rich driver gas to a pressure appropriate for the oil well. Finally, the high pressure $CO_2$-rich driver gas 813 is injected via an injection line into injection well 815. The oil is recovered using the same injection well 815 ("Huff-and-Puff") or another production well 817. After oil recovery 819, a portion of the recovered oil is fed back into sulfur removal module 803, therefore completing the closed-loop system. A small portion of the oil recovered is sacrificed in order to extract a significant amount of oil from the oil well. The hydrogen gas 811 is fed to gas turbine 825, where it generates electricity via generator 827, which may be fed to the electric grid 829 or used on-site. As with the coal reforming modules, heat recovered from the local oil reformer module may be used to generate electrical or mechanical power to drive the compressor module or other system hardware. When using locally produced crude oil in the reformer module, as when using coal or natural gas, sulfur removal may be necessary, and may be effectuated in a similar manner.

Example of a Modular Design

Figure 9:
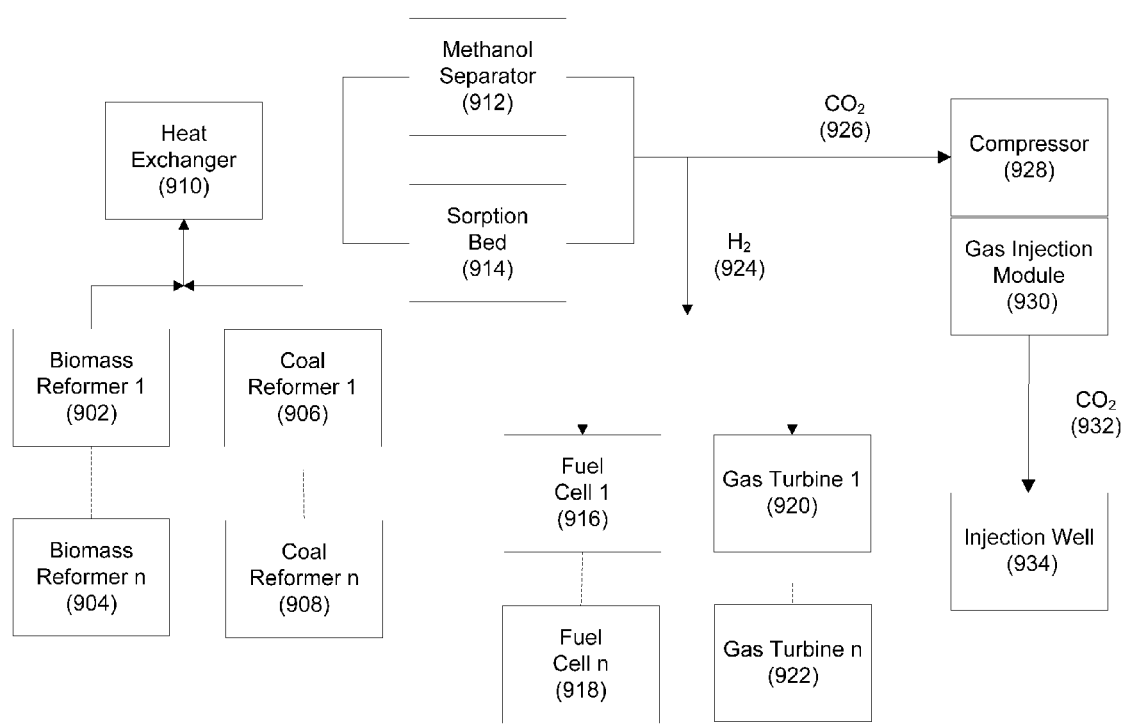
FIG. 9 illustrates how a power plant of the present invention may be composed of one or more modules according to another embodiment of the present invention.

FIG. 9 shows an example of a modular design 900 that includes one or more interchangeable modules which may be used. For example, any of a number of reformer modules may be used. Biomass reformer modules 902 and 904, coal reformer modules 906 and 908, are shown for illustrative purposes only. A local oil reformer module, a methanol reformer module, or any other reformer module according to the present invention may be used in-situ. Any heat exchange module, such as heat exchanger 910, and any gas separator module, such as methanol separator module 912 or sorption bed 914, may be used in-situ. Any power generator module, such as fuel cells 916 and 918 or gas turbines 920 and 922, may be used in-situ and fueled off the hydrogen gas 924. Any compressor module, such as compressor 928, may be used in-situ to compress the $CO_2$ gas 926. Any gas injection module, such as injection module 930, may be attached to the compressor module 928. The gas injection module may be a port, a hole, or any interconnecting interface between the compressor module 928 and an injection well 934. Driver gas rich in $CO_2$ 932 exits the compressor module 928 via injection module 930 and is sent into the injection well 934.

The modules are placed in-situ and interconnected in the appropriate fashion. They may be transported on a chassis, transported on a truck, boat, plane, or other vehicle, and interconnected on-site. They may be transported together or separately. They may be assembled on-site, either from modular components brought from off-site, or constructed on the premises of the oil field de-novo.

Figure 10:
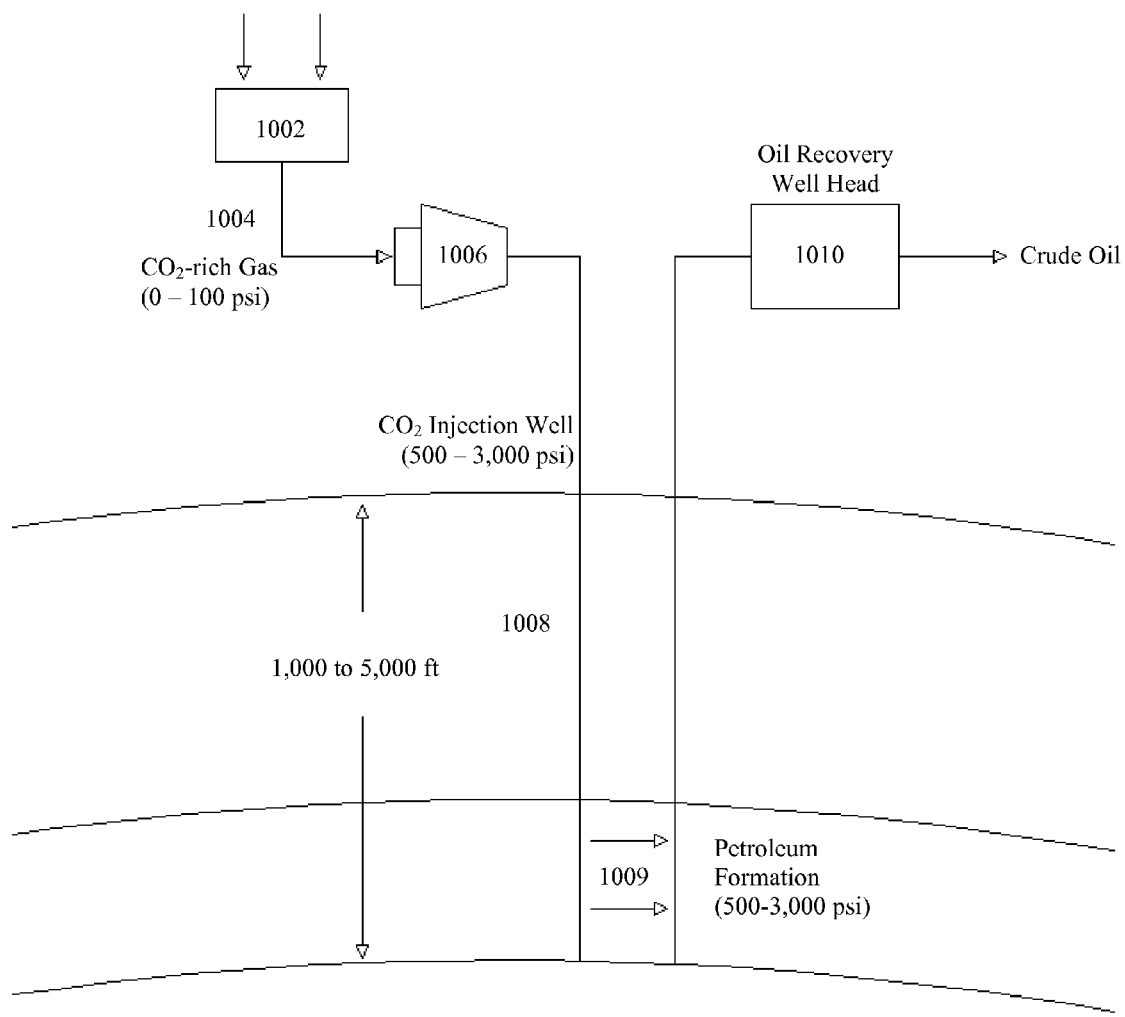
FIG. 10 illustrates an example of an embodiment of the present invention for the extraction of oil from an oil well.

In FIG. 10, an oil site 1000 (which may be otherwise "depleted") having a residual amount of oil is illustrated. The simplest configuration of the system, having a reformer module and a compressor module, is shown. An in-situ reformer module 1002 in accordance with the present invention generates driver gas (shown as arrow 1004) that may be pumped into an injection well 1008 for removing the residual oil 1009 from the oil site 1000. As explained herein, the reformer module 1002 may reform or react fuel sources such as biomass, natural gas, coal, and other like materials (or mixtures thereof) with (or without) water to form driver gas 1004 which, in one example, is a hydrogen and carbon dioxide gas mixture. The driver gas 1004 is then compressed by a compressor module 1006 into high pressure gas that could be pumped underground, via injection well 1008, where it could impose pressure on residual underground petroleum 1009 sufficient to allow it to be extracted by the same oil well, a nearby oil well 1010, or other like site. As shown in FIG. 10, all of the driver gas, including both the carbon dioxide and hydrogen, may be injected into the well for the purposes of oil recovery. In an alternative embodiment, not shown in FIG. 10 and described next, all or part of the hydrogen may be separated from the carbon dioxide and, instead of being injected into the oil well, used for alternative purposes such as the generation of electric power or the hydrogenation of oil.

Figure 11:
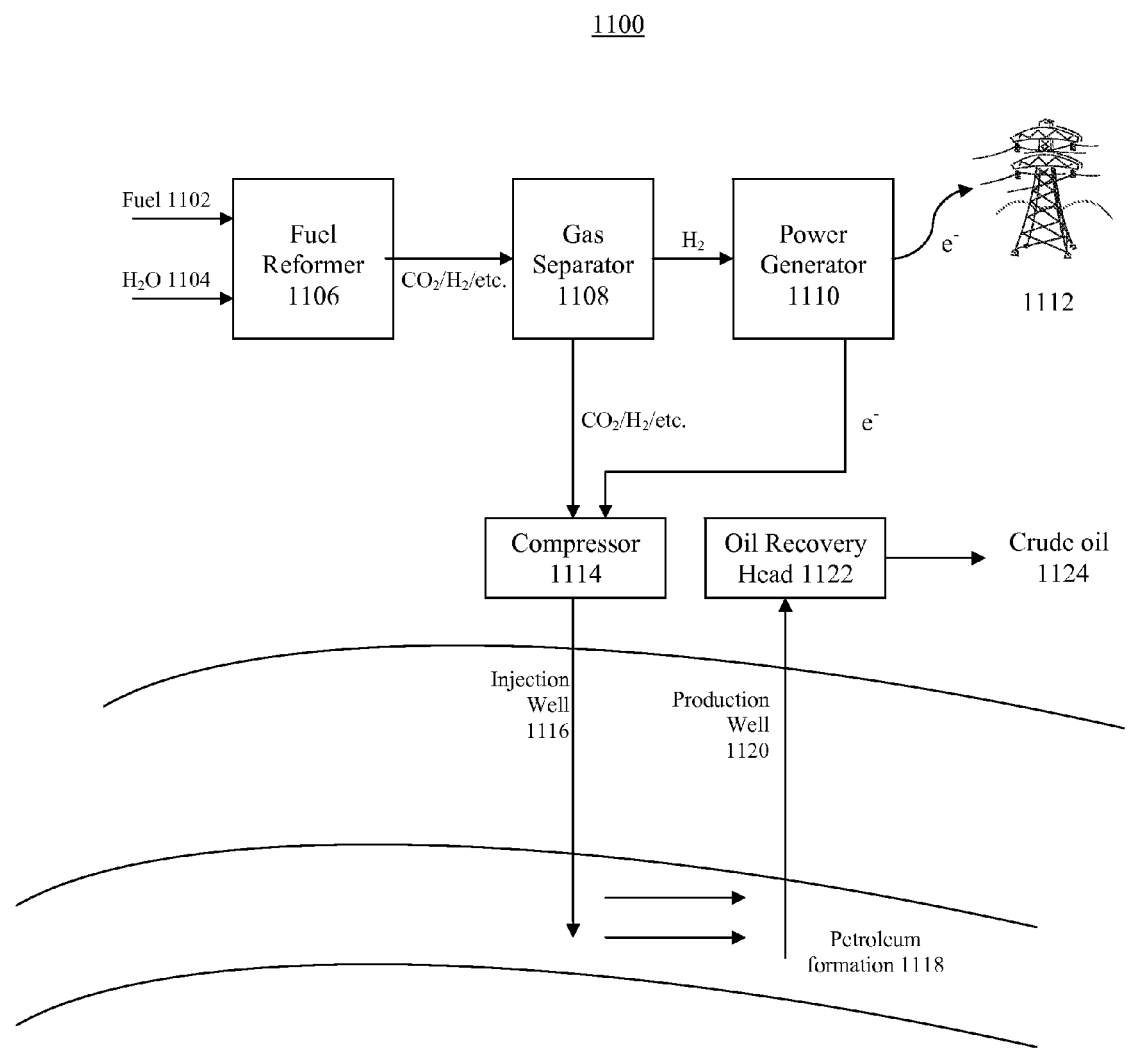
FIG. 11 illustrates another example of an embodiment of the present invention for the extraction of oil from an oil well and for the generation of electrical power.

FIG. 11 illustrates another example of an embodiment 1100 of the present invention for extracting oil from an oil site and for generating electricity. This example is illustrative only, and is not intended to limit the scope of the present invention. Fuel 1102 and water 1104 are fed into reformer module 1106. The fuel and water may also be pre-mixed and fed into reformer 1106 as a single stream. Oxygen, or another oxidizing agent, may be added to reformer 1106 via another line (not shown), or pre-mixed with either the fuel, or water, or both. Generated driver gas, which may include $CO_2$, $H_2$, as well as other gases, is fed into gas separator 1108, which separates a portion of the hydrogen gas from the other driver gases. A portion of the separated hydrogen gas is fed into power generator 1110, which could be a gas turbine, to generate electricity. A portion of the electricity is fed into the electric grid 1112. A portion of the electricity may also be used on-site, to provide power to various modules, such as the compressor 1114. The rest of the driver gas is compressed by compressor 1114 for injection into injection well 1116. The driver gases, including the carbon dioxide as well as a portion of the hydrogen gas, and potentially other gases (such as $N_2$), pressurize the underground petroleum formation 1118 and reduce its viscosity. Crude oil 1124 is more amenable to recovery by oil recovery head 1122 via production well 1120, or other like site.

This is but one system configuration that is possible utilizing the modular components of the present invention, and the present invention is not limited to this particular configuration. For example, an operator who does not wish to generate electricity, and/or an operator who wishes to use all of the hydrogen gas along with the carbon dioxide gas for enhanced oil recovery, would not use a gas separator module or a power generator module, but would still use a reformer module and a compressor module. As another example, an operator who wishes to operate a hydrogenation plant near the oil well may chose to use a gas separator module to separate the hydrogen, but may chose not to use a power generator module. Such an operator would still use the other modules, and would feed the hydrogen gas to the hydrogenation plant.

That is, in one embodiment of the present invention, the hydrogen gas may be separated, and used separately from the carbon dioxide gas. For example, the hydrogen gas may be burned in a gas turbine, or sold to the petrochemical industry for crude oil refinery utilization (not illustrated), or to other parties for other purposes. In an alternative embodiment of the present invention, the hydrogen may be mixed with the carbon dioxide, and used in conjunction with the carbon dioxide for enhanced oil recovery.

Figure 12:
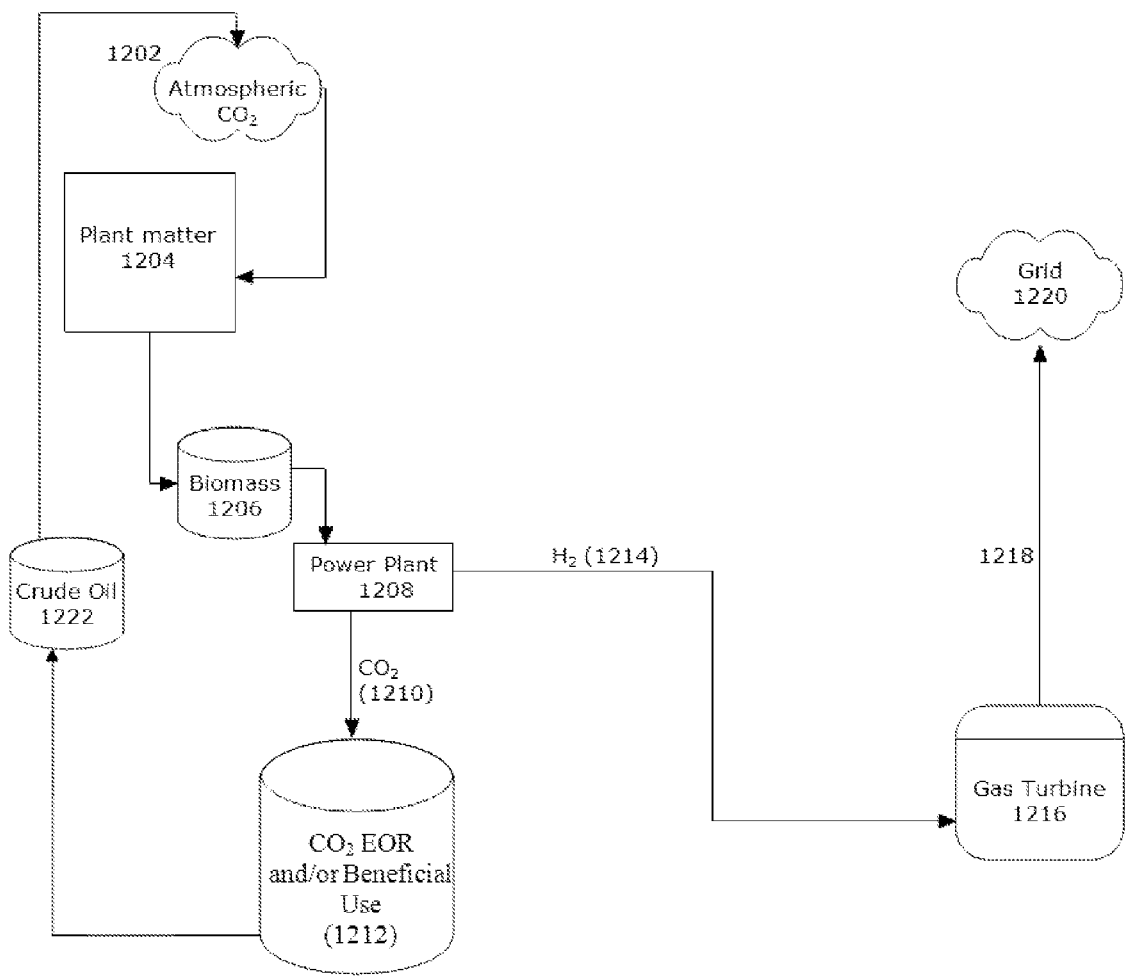
FIG. 12 illustrates a sample flow of $CO_2$ associated with an apparatus according to one embodiment of the present invention utilizing biomass, showing net reductions of atmospheric $CO_2$.

FIG. 12 illustrates a scenario 1200 where an oil field operator uses a biomass system capable of generating one million cubic feet of $CO_2$ a day (or 1,000 kcf) and 1,400 kcf of hydrogen. In this scenario, the $CO_2$ is sequestered underground in the field, generating about 100 extra barrels of crude oil per day while the hydrogen is burned on site to generate emissions-free, distributed electricity which is sold to a local utility grid. In the discussion below, the figure illustrates the amount of $CO_2$ sequestered for each barrel of oil produced and clean electricity generated.

In FIG. 12, atmospheric $CO_2$ 1202 is captured by plant matter 1204 during the course of the natural carbon cycle. The carbon ends up in the plant matter biomass 1204, which is harvested for use in the system. About 307 kg of biomass 1206, which contains about 138 kg of carbon, is fed into the power plant 1208 designed according to the principles of the present invention. The power plant 1208 generates about 10 kcf of $CO_2$ 1210, which is used to extract an extra barrel of oil 1222 from an oil field 1212. One barrel of oil contains about 120 kg of carbon, out of which, on average, about 103 kg is released as atmospheric $CO_2$ 1202 when the oil is consumed, completing the carbon cycle. Thus, about 30% more carbon is sequestered underground than is released when the refined oil product is ultimately consumed, for example, in a vehicle driving on a highway.

Simultaneously, as shown in FIG. 12, hydrogen 1214 is also generated, which is fed to a 1.8 MW gas turbine 1216, which generates clean electricity 1218, which can be used for local field operations, or sold to the utility grid 1220. This electricity is carbon-free, since $H_2$ is a clean-burning fuel and does not release any $CO_2$ upon combustion in the gas turbine.

Therefore, according to one broad aspect of one embodiment of the present invention, both carbon-negative oil and carbon-free electricity may be generated using the principles of the present invention in an economical and financially profitable manner.

Parametric Economic Analysis: Choosing Between Reformer Modules

A parametric economic model was designed to assist an operator in selecting an appropriate fuel reformer. Certain assumptions are input into the model (for example, cost of raw materials and capital/operating expenses). The model may be used to select among alternative fuel sources, reformer modules, and among other appropriate modules for the system.

A sample economic analysis was performed to determine the profitability of using the system for enhanced oil recovery in a particular oil field under particular market conditions. The results indicate that the operation of the system is profitable in this particular scenario if the system feeds are coal, natural gas, propane, or local oil. The profits are directly proportional to the efficacy of $H_2$ relative to $CO_2$ at recovering oil and inversely proportional to the cost of the feedstock.

Several assumptions were made about the unit size, the feedstock materials, and the capital and operating expenses when utilizing the present invention in this particular hypothetical scenario. An assumption was made on the unit size of the reformer modules. The calculations were based on a modular system, with each reformer module producing 250 kcf (thousand cubic feet) of $CO_2$ per day of operations. Two scenarios were calculated, one in which a single 250 kcf/day reformer module is used (FIG. 13) and one in which four such reformer modules are used at a single oil site to produce a gross of 1 MMcf/day (FIG. 14).

The feedstocks included in this analysis were coal, local oil, natural gas, propane, and methanol. For calculation purposes, natural gas was assumed to be equivalent to methane and local oil was assumed to have properties similar to n-decane. The prices and properties of the reforming and combustion reactions are tabulated in Table 2. The price includes a $14 delivery charge to the site. This includes 500 miles by rail at 1.4 ¢/ton-mile and 50 miles by truck at 14 ¢/ton-mile (1 ton=2200 lbs.) based on data obtained from the United States Department of Energy (DOE). Coal was assumed to have an average cost of $44 per ton (a conservative estimate), local oil was assumed to have an average value of $60/barrel, methane (natural gas) was assumed to have an average cost of $6.60/kcf, methanol was assumed to have an average cost of $1.65/gallon, and propane was assumed to have an average cost of $1.00/gallon. All pricing data was acquired from the U.S. Department of Energy.

Table 2 summarizes the input parameters. Of course, an operator of the present invention would adjust these input parameters to fit the appropriate conditions of the oil well that the operator was considering.

TABLE 2

Cost, energy content, and $CO_2$ and $H_2$ production quantities of various fuels

| | | Reforming per ton fuel | | | Combustion per ton fuel | |
|---|---|---|---|---|---|---|
| | Price | energy | | | | |
| | $/ton | (kJ) | cf $CO_2$ | cf $H_2$ | energy (kJ) | cf $CO_2$ |
| Coal | $ 44 | 14.8E+06 | 70,666 | 141,332 | −32.8E+06 | 70,666 |
| Local oil | $469 | 14.5E+06 | 58,889 | 182,556 | −43.6E+06 | 69,444 |
| Methane | $350 | 15.4E+06 | 53,000 | 212,000 | −50.1E+06 | 62,500 |
| Methanol | $565 | 2.0E+06 | 26,500 | 53,000 | −19.9E+06 | 26,500 |
| Propane | $544 | 8.4E+06 | 57,818 | 192,727 | −46.4E+06 | 57,818 |

The capital and operating expenses were based on four scenarios depending on the feedstock and whether the $H_2$ is injected for oil recovery or separated for electricity production.

It was assumed that the use of coal would require an additional $500,000 in capital expenses for the additional processing steps associated with the coal reformer modules described above. Furthermore, if the $H_2$ is separated and converted into electricity, it was assumed that there would be an additional $500,000 increase in capital expenses for the gas separator and power generator modules described above. The capital expenses were amortized over a period of 10 years. The operating expenses were assumed to be slightly higher if coal is used as the feedstock material considering the ancillary equipment associated with the coal reformer modules described above. The capital expenses and operating expenses are summarized in Table 3.

TABLE 3

Capital and operating expenses for various scenarios

| | Feedstock | $H_2$ injected | $H_2$ separated | Comment |
|---|---|---|---|---|
| Capital Expenses | Coal | $1,500,000 | $2,000,000 | amortized over 10 years |
| Capital Expenses | Other | $1,000,000 | $1,500,000 | amortized over 10 years |
| Operating Expenses | Coal | $ 300,000 | $ 450,000 | per year |
| Operating Expenses | Other | $ 200,000 | $ 300,000 | per year |

It was also assumed that each 10 kcf of $CO_2$ injected would lead to 1 bbl of oil recovered. It was also assumed that hydrogen could be converted to electricity with 33% efficiency and that the electricity could be sold for 100 per kWe-hr ($0.10/kWh, based on data from the U.S. Department of Energy). It should also be noted that the $CO_2$ produced from the combustion reaction was assumed to be separated from the flue gas and injected into the well for oil recovery.

Using the assumptions above, a cost of operating a 250 kcf/day reformer module with different operating parameters was calculated. The performance was calculated with different combinations of fuels for the reforming reaction and the combustion reaction; whether the hydrogen was injected into the well or separated for electricity production; and with different efficacies of hydrogen at oil recovery relative to $CO_2$. The results of this analysis are shown in FIG. 13 for a single day of operation at a $CO_2$ output of 250 kcf/day from the reformer module. Similarly, results were obtained for an oil field operating four such reformer modules simultaneously to produce 1,000 kcf $CO_2$ in a single day of operation, as shown in FIG. 14. (Note that the financial multiples improve with the use of four reformer modules.)

Utilizing the calculated results, financial multipliers may be determined as a function of the effectiveness of hydrogen at oil recovery relative to $CO_2$. This function is shown for different fuels in FIG. 15. It is clear that the profits increase with the effectiveness of hydrogen relative to $CO_2$ for all reformer fuels. Notably, even if the hydrogen does not aid in oil recovery, using coal, methane, or local oil is still profitable with financial multipliers ranging from 1.2 for local oil to 2.2 for coal.

Figure 15:
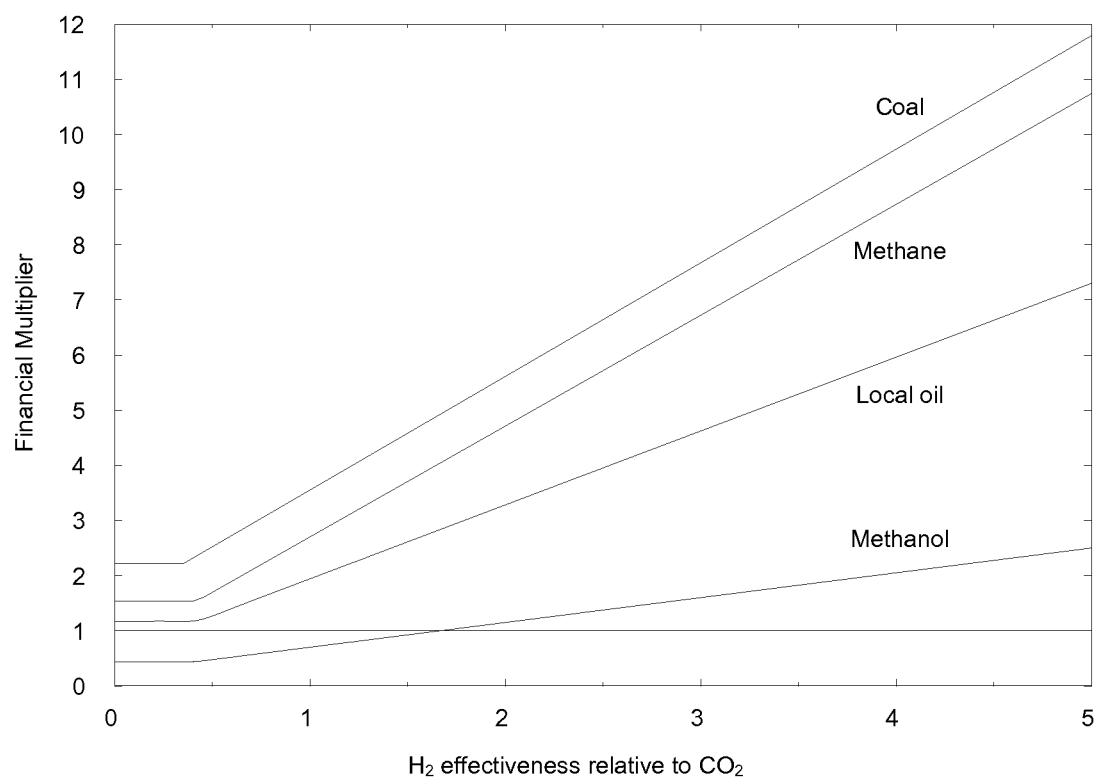
FIG. 15 illustrates a parametric economic model comparing financial multipliers for various feedstock materials as a function of the hydrogen effectiveness relative to carbon dioxide effectiveness in enhancing oil recovery.

The results of FIGS. 13-15 indicate that the financial returns are impressive, especially when a cheap fuel such as coal is used and hydrogen is at least as effective as $CO_2$ at oil recovery ($4 to $6 return on each dollar invested).

Preliminary laboratory test results, which measured only short-term effects of hydrogen (that is, its physical, not its chemical effects), show hydrogen to be 25% as effective, on a molecule-for-molecule basis, as $CO_2$ in reducing oil viscosity. This is a significant finding, because as shown by Reactions 4-11, significantly more hydrogen is produced on a molar basis than carbon dioxide. If four times as much hydrogen is produced as carbon dioxide from steam reforming, and hydrogen is 25% as effective as $CO_2$, then the total amount of hydrogen is as effective as the $CO_2$ in enhanced oil recovery, and the additional hydrogen increases the efficiency of $CO_2$-EOR by two-fold. Further, the preliminary test results did not take into account the long-term chemical effects of hydrogen-petroleum interaction (such as in-situ hydrogenation, for example), nor the potential cooperative effects of hydrogen and carbon dioxide.

Thus it may be seen that carbon dioxide and hydrogen, working alone or in combination, have unique properties that can be applied to the problems of improved recovery of crude oil.

Other Embodiments

Therefore, according to one broad aspect of one embodiment of the present invention, both carbon-negative oil and carbon-free electricity may be generated using the principles of the present invention in an economical and financially profitable manner. In fact, using the principles of the present invention, any carbon-intensive industrial process can be turned into a low-carbon intensive process, or even a carbon-negative process, by utilizing the principles taught in the present invention.

Accordingly, another embodiment of the present invention is a hydrocarbon, which when combusted, releases less carbon dioxide than the amount of carbon dioxide sequestered underground during a process of extracting the hydrocarbon.

Yet another embodiment of the present invention is a petroleum product extracted by a process comprising the steps of injecting carbon dioxide into an injection well, and recovering the petroleum product from a production well, where an amount of carbon dioxide injected into the injection well is greater than or equal to an amount of carbon dioxide released into the atmosphere when the petroleum product is combusted.

Yet another embodiment of the present invention is a method for removing carbon dioxide from the atmosphere, and hence helping mitigate global warming, the method comprising the steps of: providing a carbonaceous fuel reaction apparatus; providing carbonaceous fuel for the carbonaceous fuel reaction apparatus; generating carbon dioxide gas from the carbonaceous fuel using the carbonaceous fuel reaction apparatus; and utilizing the carbon dioxide gas in a manner that substantially does not release the carbon dioxide gas into the atmosphere.

Another embodiment of the present invention is the method above, where the carbon dioxide gas is used to grow algae and/or plants in greenhouses. Yet another embodiment of the present invention is the method above, where the carbon dioxide is sequestered underground in a saline aquifer, depleted oil field, depleted gas field, and/or unmineable coal seam. Yet another embodiment of the present invention is the method above, where the carbon dioxide is used for enhanced oil recovery (EOR), enhanced gas recovery, and/or enhanced coal-bed methane recovery. Yet another embodiment includes sequestering the $CO_2$ in the oceans.

In yet another alternative embodiment of the present invention, the principles of the present invention may be used to retrofit an existing natural gas-fired power plant to work with biomass and/or coal, while reducing $CO_2$ emissions. Natural gas power plants, especially natural gas combined cycle (NGCC) power plants, are gaining in popularity because of their higher efficiencies and less carbon dioxide emissions as compared to coal-fired power plants. Unfortunately, the price of natural gas is highly volatile, being coupled to the volatility of petroleum prices. Therefore, it would be advantageous to utilize coal and/or biomass as a feedstock in an NGCC plant without losing the thermal and environmental efficiencies of an NGCC plant. The principles of the present invention may be used to create a high-pressure stream of $H_2$ and a high pressure stream of $CO_2$, which may be easily sequestered or beneficially utilized. The $H_2$ may then be fed into a traditional NGCC power plant, hence retrofitting an existing NGCC power plant to run on coal and/or biomass, which is a fuel significantly cheaper than natural gas and without the price volatility of natural gas. In addition, the $H_2$ burns even cleaner than the original natural gas, and therefore the present invention may be used to retrofit a natural gas power plant to run on hydrogen, while sequestering nearly 100% of the $CO_2$ in the coal and/or biomass used as the fuel source.

As an alternative to using a reforming reaction to generate high pressure gas, it is an alternative embodiment of the present invention to use combustion and/or gasification followed by water-gas-shift reaction to generate the gases, and still be within the spirit and scope of the present invention. In general, a reforming reaction is preferable to using combustion or gasification using air because either reaction would produce driver gas mixed with large amounts of nitrogen from air, which is undesirable. As an alternative to using air-blow combustion or gasification, it is another embodiment of the present invention to use oxygen-blown combustion or gasification, and still be within the spirit and scope of the present invention. In general, a reforming reaction is still preferable to using oxygen-blown combustion or gasification, because in either case, a source of pure oxygen is required, which must be separated from air, introducing an additional expense.

INDUSTRIAL APPLICATIONS OF THE PRESENT INVENTION

The worldwide oil industry today faces declining productivity in numerous oil fields that have reached a near-depleted state where the standard extraction methods can no longer provide profitable results.

A typical oil field goes through three distinct phases:

Phase 1—Primary recovery: The average initial recovery produces about 30% of the oil in the reservoir and is accomplished by relying on the existing underground gas pressure.

Phase 2—Secondary recovery: An additional 10%-30% of the underground oil can be extracted from the reservoir using such methods as water flooding. Towards the end of Phase 1 there is a gradual decline in oil recovery productivity, leading to a transition into Phase 2, which boosts oil recovery productivity by injecting water to drive the oil out of the reservoir. When Phase 2 nears completion, however, most oil fields cannot transition into Phase 3 because it is not economically feasible to do so.

Phase 3—Enhanced Oil Recovery (EOR): Carbon dioxide ($CO_2$) gas flooding can be used in order to extract about 20% more oil from the reservoir, extending the productive life of the field by 10-25 years. When an oil field's productivity declines towards Phase 3 and enters a certain low profitability plateau, it is considered to be "depleted". At this point, the field may be capped and abandoned or otherwise minimally operated, unless it is able to utilize EOR techniques in a profitable way.

While Phase 1 and Phase 2 are not very complex and yield high profit margins, Phase 3 poses a problem for literally thousands of oil fields in the U.S. alone and many thousands more worldwide.

As discussed above, the major problem with $CO_2$-EOR is that for most oil fields, $CO_2$ is not readily available at or near the oil site. This means that the $CO_2$ must be obtained from natural or industrial sources, and delivered to the oil field over long distances, usually via a pipeline. For most oil fields, a $CO_2$ pipeline is not a viable option because of a mix of several problems, including but not limited to, the capital investment for building a pipeline—sometimes tens of millions of dollars; the time-frame of building a pipeline—several years; the distance and terrain issues between the source and destination which either make the pipeline impossible or simply not economical; and the time it takes to start generating an increase in productivity—return on investment (ROI) is long.

When faced with the hurdles and overall costs of the pipeline-delivered $CO_2$, as described above, the Phase-3 $CO_2$ EOR simply does not make economical sense for most oil fields. According to several studies conducted by the U.S. Department of Energy, there are thousands of oil fields in the United States that cannot achieve a financially viable $CO_2$-EOR production with the currently available $CO_2$ sources and technologies, due to economic and geographic constraints with the current available $CO_2$ sources and technologies.

For example, one DOE study found that "$CO_2$ enhanced oil recovery (EOR) is usually only applied when there is an abundant $CO_2$ source nearby the well. This is certainly not the case in Kansas where there are hundreds of millions of barrels of oil available that is currently out of reach because there is no local source of $CO_2$." Oil fields such as the Kansas example above and many others, including oil fields in Pennsylvania, Ohio, West Virginia, Kentucky, Colorado, Wyoming, California, etc. are potential places of application for the present invention.

The innovative system produces both carbon dioxide gas ($CO_2$) and hydrogen gas ($H_2$) at low cost, specifically tailored to the needs of oil fields that are facing declining productivity and require Enhanced Oil Recovery.

The key factors behind the current solution to the EOR challenges are:

Reforming carbonaceous material and water into $CO_2$ and hydrogen. Carbonaceous material, including biomass, is very common, cheap and commercially available almost anywhere in large quantities, making it an ideal fuel stock.

Overall gas production cost is well below $2 per thousand cubic feet (kcf) of $CO_2$—providing a large margin to the DOE's $2/kcf $CO_2$ threshold of economic viability.

Added value from hydrogen, which may be used either to produce "green" electricity or for more efficient oil recovery.

On-site gas production at the oil field—overcoming the geographic and financial constraints of delivering $CO_2$ to the oil field, eliminating the need for expensive pipelines and large gas plants.

Modular: The system may be modular—allowing use of fuels other than biomass, when such fuels are naturally available at the oil field, such as "stranded" natural gas that would otherwise be flared.

Green Electricity: The system produces electricity without harmful greenhouse gas emissions—proposals are being considered to create taxes on $CO_2$ emissions—the system would allow oil to be recovered without incurring these tax penalties. Further income could be obtained by selling carbon credits to others.

According to the U.S. Department of Energy, at an oil price of $60/bbl, operators are willing to undertake EOR if $CO_2$ can be obtained for a price of $2/kcf.

Hydrogen is valuable in at least three possible ways:

Hydrogen can be burned to produce electricity.

Hydrogen could be effective in extracting oil when injected into the ground along with the $CO_2$.

Hydrogen can be used in chemical processes to hydrogenate heavy oils, increasing their value, as well as for other purposes.

Macroeconomic Impact

Above, the impact of the technology on a single user was discussed, to show that it would be highly profitable. This is the key to the propagation of the technology to a large number of fields. In this section, the macroeconomic effect of the technology is discussed once it has been put into broad use, showing that it could have a major impact in both securing America's oil supply, meeting expanded electricity needs, and reducing carbon emissions.

The DOE has identified 1100 major oil reservoirs containing collectively hundreds of thousands of oil fields that would be amenable to EOR, provided a source of $CO_2$ were available. Currently, only a tiny fraction of these fields can access $CO_2$. This system would make $CO_2$ available to all of them. According to the DOE, EOR currently provides approximately 5% of U.S. oil production. Once this system is made available, this fraction could increase dramatically.

Let us consider: With over 100,000 oilfields needing $CO_2$ for EOR, it is reasonable to assume that eventually 10,000 units could be put into operation in the U.S. alone. These would collectively produce 1 million barrels of oil per day, an increase on the order of 15% of the American domestic oil production. Additional units deployed outside the U.S. would add vast additional petroleum reserves to the world's available resources, making the fuel supply of all nations more plentiful and secure. Furthermore, since when using biomass, more $CO_2$ would be sequestered in the process of producing this oil than that released by burning it, the use of such oil would add nothing to global atmospheric $CO_2$ concentrations. This is very important, because as China, India, and other nations industrialize, there may soon be billions of additional automobiles operating around the world. This technology distributed internationally would allow them to be fueled without driving climate change.

In addition to providing net carbon emission-free oil, 10,000 American units would also make available 20,000 MW (20 GW) of renewable carbon emission-free electricity, available as desired, around the clock in the U.S. alone. Still more benefits would accrue as the technology is disseminated internationally.

Thus it can be seen that the deployment of this technology according to the principles of the present invention will meet the critical goals of securing America's oil and electricity supplies while reducing carbon emissions both here and around the globe.

As shown above, the amount of hydrogen produced by reforming sufficient biomass to produce 1-10 MMcf/day of carbon dioxide driver gas is also sufficient to produce about 2-20 Megawatts (MW) of electric power. This is a convenient size to feed meaningful amounts of electricity into an electric power grid to support growth of demand faced by power companies in a modular fashion, without the need for massive investment in new, large-scale (approximately 250-1000 MW) facilities. Thus, the mass production and deployment of the present invention could be potentially very attractive to utility companies, allowing them to meet their customer's demand for increased supply, without the risk of major investments in large facilities, while receiving their power from a constant, regularly-available, carbon-emission-free source. This is in contrast to supplementing utility power with wind turbines, solar cells, and the like, whose power, while also carbon-emissions-free, is only available on an intermittent, irregular basis.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A method of using an in-situ apparatus for generating carbon dioxide gas near an oil site for use in enhanced oil recovery, comprising:

bringing an in-situ apparatus for generating carbon dioxide gas to an oil site, the apparatus comprising a steam generator adapted to boil and superheat water to generate a source of superheated steam; a source of essentially pure oxygen; a steam reformer, located adjacent to the oil site, adapted to react a carbonaceous material with the superheated steam and the pure oxygen, in an absence of air, to generate a driver gas comprising primarily carbon dioxide gas and hydrogen gas, wherein at least a portion of the carbonaceous material is obtained from a location outside the oil site; and a separator adapted to separate at least a portion of the carbon dioxide gas from the driver gas to generate a carbon dioxide-rich driver gas and a hydrogen-rich fuel gas, wherein the separator is a methanol-based separator operating in a temperature-swing cycle between approximately −60° C. and +40° C., or a pressure-swing cycle between approximately 1 bar and 100 bar;

providing a source of superheated steam;

providing a source of essentially pure oxygen;

controlling an input oxygen-to-steam ratio based on a temperature, a pressure, and a gas composition of a driver gas in real-time;

steam reforming a carbonaceous material with the superheated steam and the pure oxygen to generate a driver gas comprising primarily carbon dioxide gas and hydrogen gas, wherein the steam reforming reaction is performed adjacent to the oil site and in an absence of air;

separating at least a portion of the carbon dioxide gas from the driver gas to generate a carbon dioxide-rich driver gas and a hydrogen-rich fuel gas;

compressing the carbon dioxide-rich driver gas for use in enhanced oil recovery; and injecting the compressed portion of the carbon dioxide-rich driver gas, with substantially no oxygen, to a predetermined depth in order to enhance oil recovery at the oil site.

2. The method of claim 1, wherein the carbonaceous material is selected from the group consisting of coal, biomass, natural gas, crude petroleum, ethanol, methanol, and trash.

3. The method of claim 1, further comprising:

generating electricity using a portion of the hydrogen-rich fuel gas.

4. The method of claim 1, further comprising:

utilizing a water gas-shift reaction downstream of the steam reforming reaction to convert residual carbon monoxide in the driver gas into additional carbon dioxide gas and additional hydrogen gas.

5. The method of claim 3, wherein the electricity generated has substantially less associated carbon dioxide emissions than electricity generated from combustion of the carbonaceous material.

6. The method of claim 1, wherein the driver gas further comprises residual carbon monoxide, and wherein the apparatus further comprises:

a water gas-shift reactor disposed downstream of the steam reformer for converting the residual carbon monoxide into additional carbon dioxide gas and additional hydrogen gas.

7. The method of claim 1, wherein the driver gas further comprises residual carbon monoxide, and wherein the apparatus further comprises:

a methanation reactor disposed downstream of the steam reformer for converting the residual carbon monoxide into methane.

8. The method of claim 1, wherein the apparatus further comprises:

a furnace adapted to utilize a portion of the hydrogen-rich fuel gas to generate heat necessary to drive the steam reformer.

9. The method of claim 1, wherein the apparatus further comprises:

a heat exchanger disposed between the steam generator and the steam reformer adapted to exchange heat between the hot driver gas exiting the steam reformer and the steam entering the steam reformer.

10. The method of claim 9, wherein the apparatus further comprises:

a condenser disposed after the heat exchanger adapted to condense and cool the driver gas before entering the separator.

11. The method of claim 1, wherein the apparatus further comprises:

a furnace adapted to utilize a portion of the hydrogen-rich fuel gas to generate a portion of the heat necessary to drive the steam reformer.

12. The method of claim 1, wherein the steam reformer operates at a temperature of approximately 600° C. to 1000° C.

13. The method of claim 1, wherein the steam reformer operates at a pressure of approximately 5 bar to 100 bar.

14. The method of claim 1, wherein the separator is a methanol-based separator operating in a temperature-swing cycle between approximately −60° C. and +40° C., or a pressure-swing cycle between approximately 21 bar and 100 bar.

15. The method of claim 1, wherein the steam reformer is selected from the group consisting of a fixed bed reformer, a fluidized bed reformer, and an entrained-flow reformer.

* * * * *